(12) United States Patent
Huang et al.

(10) Patent No.: US 9,397,730 B2
(45) Date of Patent: Jul. 19, 2016

(54) SYSTEM, BASE STATION AND METHOD OF SIGNAL PROCESSING

(71) Applicant: HUAWEI TECHNOLOGIES CO., LTD., Shenzhen (CN)

(72) Inventors: Yinghua Huang, Shanghai (CN); Feng Xing, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 13/909,535

(22) Filed: Jun. 4, 2013

(65) Prior Publication Data

US 2013/0265969 A1 Oct. 10, 2013

Related U.S. Application Data

(63) Continuation of application No. PCT/CN2011/082970, filed on Nov. 25, 2011.

(51) Int. Cl.
*H04B 7/02* (2006.01)
*H04L 27/26* (2006.01)
*H04W 88/08* (2009.01)
(Continued)

(52) U.S. Cl.
CPC ............ *H04B 7/024* (2013.01); *H04L 27/265* (2013.01); *H04W 72/0413* (2013.01); *H04W 88/08* (2013.01); *H04W 72/0426* (2013.01); *H04W 92/20* (2013.01)

(58) Field of Classification Search
CPC ...................................................... H04B 7/024
See application file for complete search history.

(56) References Cited

U.S. PATENT DOCUMENTS

| 8,396,153 | B1 * | 3/2013 | Shen et al. ................... 375/267 |
| 2010/0027456 | A1 * | 2/2010 | Onggosanusi ......... H04B 7/024 370/312 |
| 2010/0067435 | A1 | 3/2010 | Balachandran et al. |
| 2011/0218010 | A1 * | 9/2011 | Hoymann et al. ............ 455/513 |
| 2012/0114050 | A1 * | 5/2012 | Osterling ...................... 375/259 |
| 2012/0163484 | A1 * | 6/2012 | Wild et al. ..................... 375/260 |
| 2012/0184218 | A1 * | 7/2012 | Boudreau et al. ........... 455/63.1 |
| 2012/0282964 | A1 * | 11/2012 | Xiao et al. .................... 455/515 |

FOREIGN PATENT DOCUMENTS

| CN | 101621813 | 1/2010 |
| CN | 101778438 | 7/2010 |

(Continued)

OTHER PUBLICATIONS

International Search Report mailed Aug. 23, 2012 in corresponding International Application No. PCT/CN2011/082970.

(Continued)

*Primary Examiner* — Jason Mattis
(74) *Attorney, Agent, or Firm* — Staas & Halsey LLP

(57) ABSTRACT

A system includes a base station (BS) and a user equipment (UE). The BS is capable of communicating with the UE via a serving cell and a coordinated cell. The BS includes a frequency exchange module coupled with a first baseband processing unit and a second baseband processing unit. The first baseband processing unit is designated for supporting baseband processing related to the coordinated cell, and the second baseband processing unit is designated for supporting baseband processing related to the serving cell. The frequency exchange module is configured to forward a first frequency domain signal to the second baseband processing unit according to a first predetermined coordination configuration relating to the serving cell of the UE and the coordinated cell of the UE. The second baseband processing unit is configured to perform a joint processing of the first frequency domain signal and a second frequency domain signal.

11 Claims, 17 Drawing Sheets

(51) Int. Cl.
*H04W 72/04* (2009.01)
*H04W 92/20* (2009.01)

(56) References Cited

FOREIGN PATENT DOCUMENTS

| CN | 101834701 | 9/2010 |
| EP | 2613606 | 7/2013 |
| WO | WO 2010/034528 | 4/2010 |
| WO | 2010/145873 A1 | 12/2010 |

OTHER PUBLICATIONS

Hoyman et al. "Distributed Uplink Signal Processing of Cooperating Base Stations base on IQ Sample Exchange" IEEE Communications Society International Conference on Communications, Jun. 2009.
Extended European Search Report issued on Nov. 29, 2013 in corresponding European Patent Application No. 11867109.8.
Chinese Office Action dated Jun. 30, 2015 in corresponding Chinese Patent Application No. 201180003141.3.

* cited by examiner

US 9,397,730 B2

SYSTEM, BASE STATION AND METHOD OF SIGNAL PROCESSING

CROSS-REFERENCE TO RELATED APPLICATIONS

This application is a continuation of International Application No. PCT/CN2011/082970, filed on Nov. 25, 2011, which is hereby incorporated by reference in its entirety.

TECHNICAL FIELD

The present invention relates to the field of communications technologies, and particularly to a system, a base station, and a method of facilitating processing of a signal sent by a user equipment to a base station.

BACKGROUND

In a long term evolution-advanced (LTE-A) system, coverage of a high data rate may be expanded, throughput of a cell edge may be improved and/or system throughput may be improved by using a coordinated multi-point transmission/reception (CoMP) technology. The so-called CoMP means that multiple transmission points (which may be understood as different cells) geographically separated from each other participate in transmitting data to or receiving data from one user equipment (UE) in coordination.

The CoMP may be classified into downlink CoMP and uplink CoMP. The downlink CoMP means that multiple cells directly or indirectly participate in sending downlink data to the same UE; and the uplink CoMP means that multiple cells receive uplink data from the same UE. The downlink CoMP is classified into joint processing and coordinated scheduling. A joint processing manner may further be classified into joint transmission and dynamic cell selection. The joint transmission means that multiple cells transmit data to one UE at the same time on a physical downlink shared channel (PDSCH), so as to improve the quality of a signal received by the UE and/or eliminate interference from other UEs. The dynamic cell selection means that only one cell sends data to a UE at each time point, and the cell may be dynamically selected from a CoMP cooperating set. In a coordinated scheduling manner, only a serving cell performs scheduling and transmission on the UE, and mutual interference among different UEs is avoided through coordination of resources such as time, frequency, power and space among cells.

SUMMARY

According to a first aspect, a system is provided. The system includes a base station (BS) and a user equipment (UE). The BS is capable of communicating with the UE via a serving cell and a coordinated cell. The BS includes a frequency exchange module coupled with a first baseband processing unit and a second baseband processing unit. The first baseband processing unit is designated for supporting baseband processing related to the coordinated cell, and the second baseband processing unit is designated for supporting baseband processing related to the serving cell. The frequency exchange module is configured to: receive a first frequency domain signal from the first baseband processing unit, the first frequency domain signal being derived from a signal sent by the UE; and determine to forward the first frequency domain signal to the second baseband processing unit according to a first predetermined coordination configuration relating to the serving cell of the UE and the coordinated cell of the UE. The second baseband processing unit is configured to: generate a second frequency domain signal being derived from the signal sent by the UE; receive the first frequency domain signal; and perform a joint processing of the first frequency domain signal and the second frequency domain signal.

According to a second aspect, a base station (BS) is provided. The BS is capable of communicating with a user equipment (UE) via a serving cell and a coordinated cell. The BS includes a frequency exchange module coupled with a first baseband processing unit and a second baseband processing unit. The first baseband processing unit is designated for supporting baseband processing related to the coordinated cell, and the second baseband processing unit is designated for supporting baseband processing related to the serving cell. The frequency exchange module is configured to: receive a first frequency domain signal from the first baseband processing unit, the first frequency domain signal being derived from a signal sent by the UE; and determine to forward the first frequency domain signal to the second baseband processing unit according to a first predetermined coordination configuration relating to the serving cell of the UE and the coordinated cell of the UE. The second baseband processing unit is configured to: generate a second frequency domain signal being derived from the signal sent by the UE; receive the first frequency domain signal; and perform a joint processing of the first frequency domain signal and the second frequency domain signal.

According to a third aspect, a method of facilitating processing of a signal sent by a user equipment (UE) to a base station (BS) is provide. The BS is capable of communicating with the UE via a serving cell and a coordinated cell. The BS includes a frequency exchange module coupled with a first baseband processing unit and a second baseband processing unit. The first baseband processing unit is designated for supporting baseband processing related to the coordinated cell, and the second baseband processing unit is designated for supporting baseband processing related to the serving cell. The frequency exchange module receives a first frequency domain signal from the first baseband processing unit, the first frequency domain signal being derived from a signal sent by the UE; and determine to forward the first frequency domain signal to the second baseband processing unit according to a first predetermined coordination configuration relating to the serving cell of the UE and the coordinated cell of the UE. The second baseband processing unit generates a second frequency domain signal being derived from the signal sent by the UE; and performs a joint processing of the first frequency domain signal and the second frequency domain signal.

These and other aspects of the invention will be apparent from the embodiments described below.

DETAILED DESCRIPTION OF THE EMBODIMENTS

Figure 1:
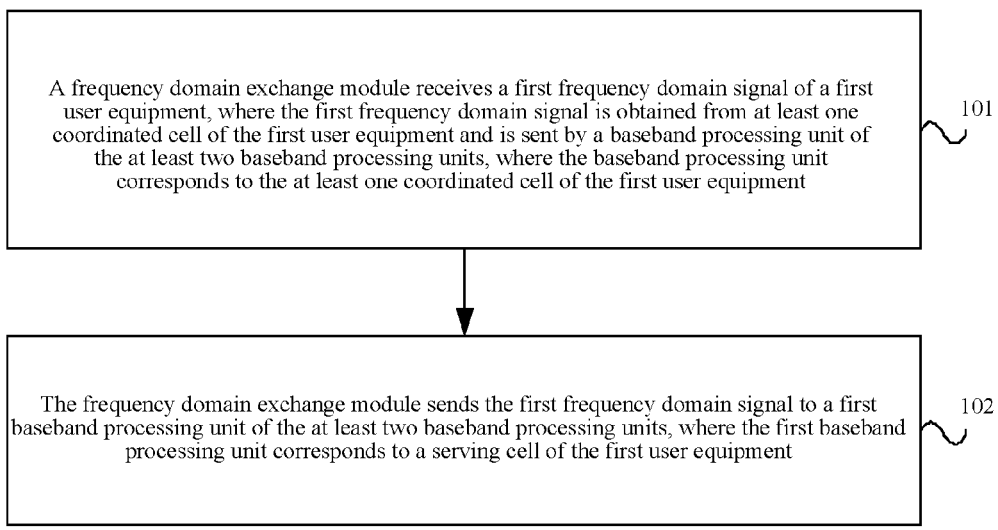
FIG. 1 is a flow chart of a signal sending method according to an embodiment of the present invention.

FIG. 1 is a flow chart of a signal sending method according to an embodiment of the present invention. The signal sending method provided in this embodiment may be applied in a base station device that includes a frequency domain exchange module and at least two baseband processing units, and the frequency domain exchange module is connected to each of the at least two baseband processing units.

As shown in FIG. 1, the signal sending method may include:

Step 101: The frequency domain exchange module receives a first frequency domain signal of a first user equipment, where the first frequency domain signal is obtained from at least one coordinated cell of the first user equipment and is sent by a baseband processing unit of the at least two baseband processing units, where the baseband processing unit corresponds to the at least one coordinated cell of the first user equipment.

The first frequency domain signal is obtained by performing a time-frequency transformation on a first time domain signal, after a baseband processing unit that corresponds to the at least one coordinated cell of the first user equipment receives the first time domain signal that is sent by the first user equipment through a radio frequency channel of the at least one coordinated cell of the first user equipment.

Specifically, the baseband processing unit that corresponds to the at least one coordinated cell of the first user equipment may perform a fast Fourier transformation (Fast Fourier Transformation, herein after referred to as FFT) and a de-mapping processing on the first time domain signal, and obtain a first frequency domain signal of the first user equipment in the at least one coordinated cell according to high-layer configuration information, where the high-layer configuration information includes a sub-carrier that is configured by a high layer (for example, a base station controller) and is used when the first user equipment sends data.

In this embodiment, when CoMP is performed, at least two cells participate in transmitting data to or receiving data from a user equipment in coordination. The at least two cells are coordinated cells for each other. For the first user equipment, at least one cell of the at least two cells other than a serving cell of the first user equipment is at least one coordinated cell of the first user equipment. Such details are not repeated in other embodiments for conciseness consideration.

Step 102: The frequency domain exchange module sends the first frequency domain signal to a first baseband processing unit of the at least two baseband processing units, where the first baseband processing unit corresponds to a serving cell of the first user equipment, so that the first baseband processing unit performs a joint processing on the first frequency domain signal and a second frequency domain signal of the first user equipment, where the second frequency domain signal is obtained from the serving cell of the first user equipment by the first baseband processing unit.

The second frequency domain signal is obtained by performing a time-frequency transformation on a second time domain signal, after the first baseband processing unit receives the second time domain signal that is sent by the first user equipment through a radio frequency channel of the serving cell of the first user equipment.

Specifically, the first baseband processing unit may perform an FFT and a de-mapping processing on the second time domain signal, and obtain a second frequency domain signal of the first user equipment in the serving cell according to high-layer configuration information, where the high-layer configuration information includes a sub-carrier that is configured by a high layer (for example, a base station controller) and is used when the first user equipment sends data.

In the foregoing embodiment, after a frequency domain exchange module receives a first frequency domain signal of a first user equipment, where the first frequency domain signal is obtained from at least one coordinated cell of the first user equipment and is sent by a baseband processing unit of at least two baseband processing units that are connected to the frequency domain exchange module, where the baseband processing unit corresponds to the at least one coordinated cell of the first user equipment, the frequency domain exchange module sends the first frequency domain signal to a first baseband processing unit of the at least two baseband processing units, where the first baseband processing unit corresponds to a serving cell of the first user equipment, so that the first baseband processing unit performs a joint processing of the first frequency domain signal and a second frequency domain signal of the first user equipment, where the second frequency domain signal is obtained from the serving cell of the first user equipment by the first baseband processing unit. In this way, data exchange between a serving cell and a coordinated cell in an LTE-A system can be implemented, thereby effectively reducing influence of interference and improving the quality of a radio signal.

Figure 2:
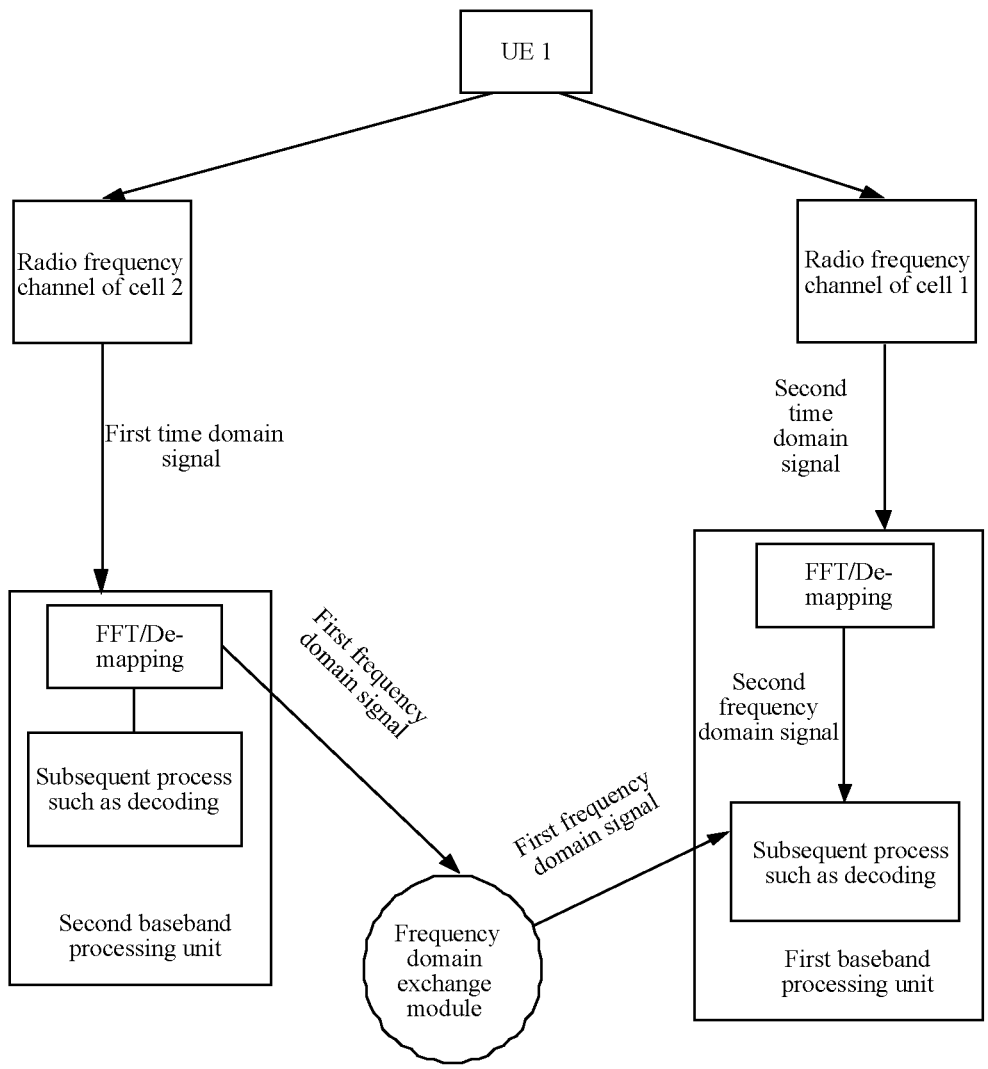
FIG. 2 is a schematic diagram of an application scenario according to an embodiment of the present invention.

The method provided in the embodiment shown in FIG. 1 of the present invention may be applied in a scenario shown in FIG. 2, and FIG. 2 is a schematic diagram of an application scenario according to an embodiment of the present invention.

In FIG. 2, cell 1 (Cell1) and cell 2 (Cell2) are coordinated cells for each other, a serving cell of UE 1 is cell 1 and a coordinated cell of UE 1 is cell 2. FIG. 2 is shown by using an example that a base station device includes a frequency domain exchange module and two baseband processing units, where the frequency domain exchange module is connected to each of the two baseband processing units. A first baseband processing unit of the two baseband processing units is a baseband processing unit that corresponds to cell 1; and a second baseband processing unit of the two baseband processing units is a baseband processing unit that corresponds to at least one coordinated cell of UE 1, that is, a baseband processing unit that corresponds to cell 2.

Figure 3:
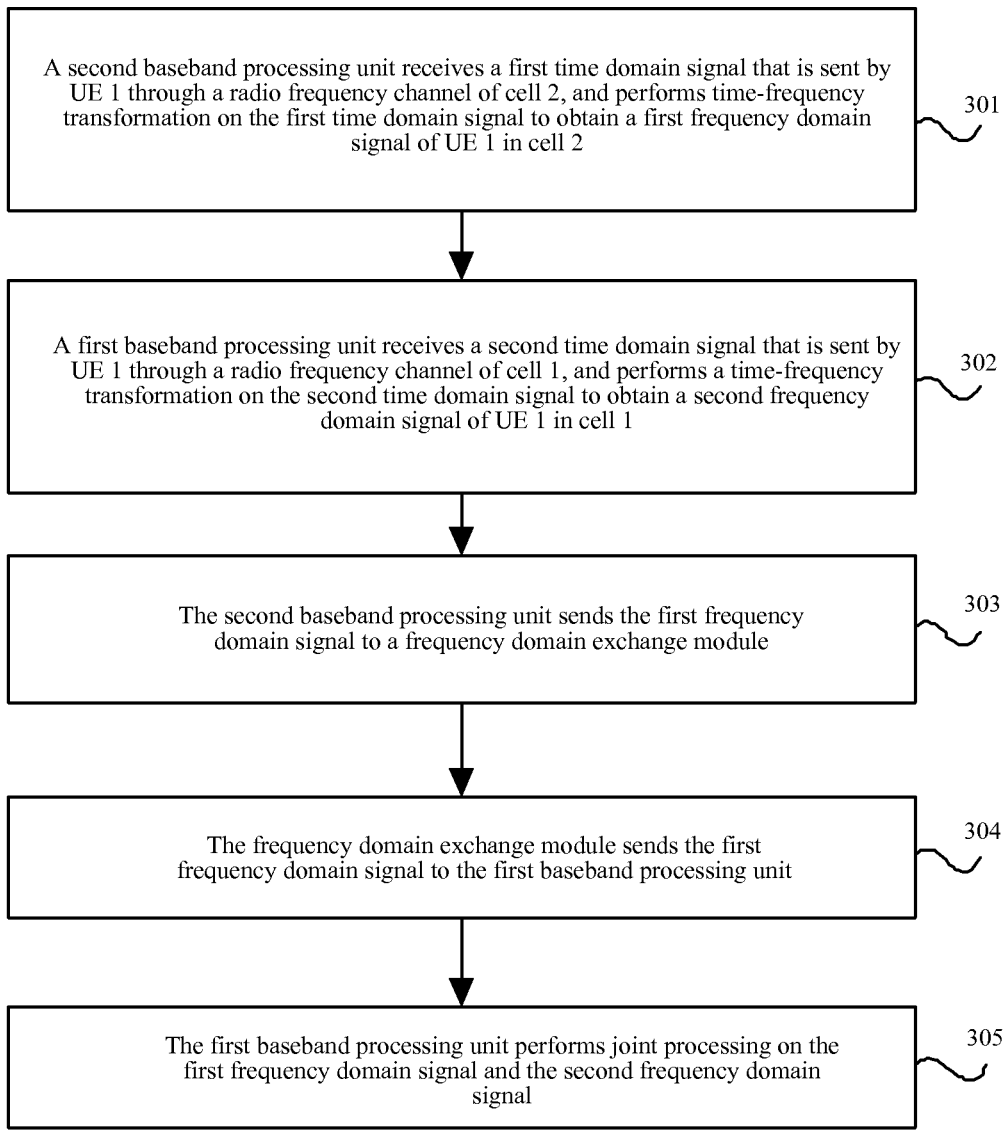
FIG. 3 is a flow chart of a signal sending method according to another embodiment of the present invention.

FIG. 3 is a flow chart of a signal sending method according to another embodiment of the present invention, and this embodiment is described by taking a CoMP process of UE 1 in FIG. 2 as an example.

As shown in FIG. 3, the signal sending method may include:

Step 301: A second baseband processing unit receives a first time domain signal that is sent by UE 1 through a radio frequency channel of cell 2, and performs a time-frequency transformation on the first time domain signal to obtain a first frequency domain signal of UE 1 in cell 2.

The second baseband processing unit may perform an FFT and a de-mapping processing on the first time domain signal, and obtain a first frequency domain signal of a first user equipment in cell 2 according to high-layer configuration information, where the high-layer configuration information includes a sub-carrier that is configured by a high layer (for example, a base station controller) and is used when UE 1 sends data.

Step 302: A first baseband processing unit receives a second time domain signal that is sent by UE 1 through a radio frequency channel of cell 1, and performs time-frequency transformation on the second time domain signal to obtain a second frequency domain signal of UE 1 in cell 1.

The first baseband processing unit may perform an FFT and a de-mapping processing on the second time domain signal, and obtain a second frequency domain signal of the first user equipment in cell 1 according to high-layer configuration information, where the high-layer configuration information includes a sub-carrier that is configured by a high layer (for example, a base station controller) and is used when UE 1 sends data.

Step 303: The second baseband processing unit sends the first frequency domain signal to a frequency domain exchange module.

Step 304: The frequency domain exchange module sends the first frequency domain signal to the first baseband processing unit.

Specifically, a sending route of the frequency domain exchange module is configured by a high layer (for example, a base station controller) according to a CoMP coordination relationship. In this embodiment, the sending route of the frequency domain exchange module is specifically that the frequency domain exchange module sends the first frequency domain signal to the first baseband processing unit.

Step 305: The first baseband processing unit performs a joint processing on the first frequency domain signal and the second frequency domain signal.

For example, the first baseband processing unit may first perform a multiple input multiple output (Multiple Input Multiple Output, hereinafter referred to as MIMO) decoding and an equalization processing on the first frequency domain signal and the second frequency domain signal, and then perform a processing such as an inverse discrete Fourier transform (Inverse Discrete Fourier Transform, hereinafter referred to as IDFT)/demodulation/de-interleaving/hybrid automatic repeat request (Hybrid Automatic Repeat Request, hereinafter referred to as HARQ) combination/decoding/cyclic redundancy check (Cyclic Redundancy Check, hereinafter referred to as CRC).

Through the foregoing embodiment, data exchange between a serving cell and a coordinated cell in an LTE-A system can be implemented, thereby effectively reducing influence of interference and improving the quality of a radio signal.

In an implementation manner of the embodiment shown in FIG. 1 of the present invention, the first time domain signal is sent by a time domain exchange module that is connected to at least two baseband processing units to a baseband processing unit that corresponds to at least one coordinated cell of the first user equipment, after the time domain exchange module receives the first time domain signal that is sent by the first user equipment through a radio frequency channel of the at least one coordinated cell of the first user equipment. The second time domain signal is sent by the time domain exchange module that is connected to the at least two baseband processing units to the first baseband processing unit, after the time domain exchange module receives the second time domain signal that is sent by the first user equipment through a radio frequency channel of a serving cell of the first user equipment.

That is to say, through the time domain exchange module, the second time domain signal that is sent by the first user equipment through the radio frequency channel of the serving cell of the first user equipment and the first time domain signal that is sent by the first user equipment through the radio frequency channel of the at least one coordinated cell of the first user equipment may be sent respectively to the first baseband processing unit and the baseband processing unit that corresponds to the at least one coordinated cell of the first user equipment.

Figure 4:
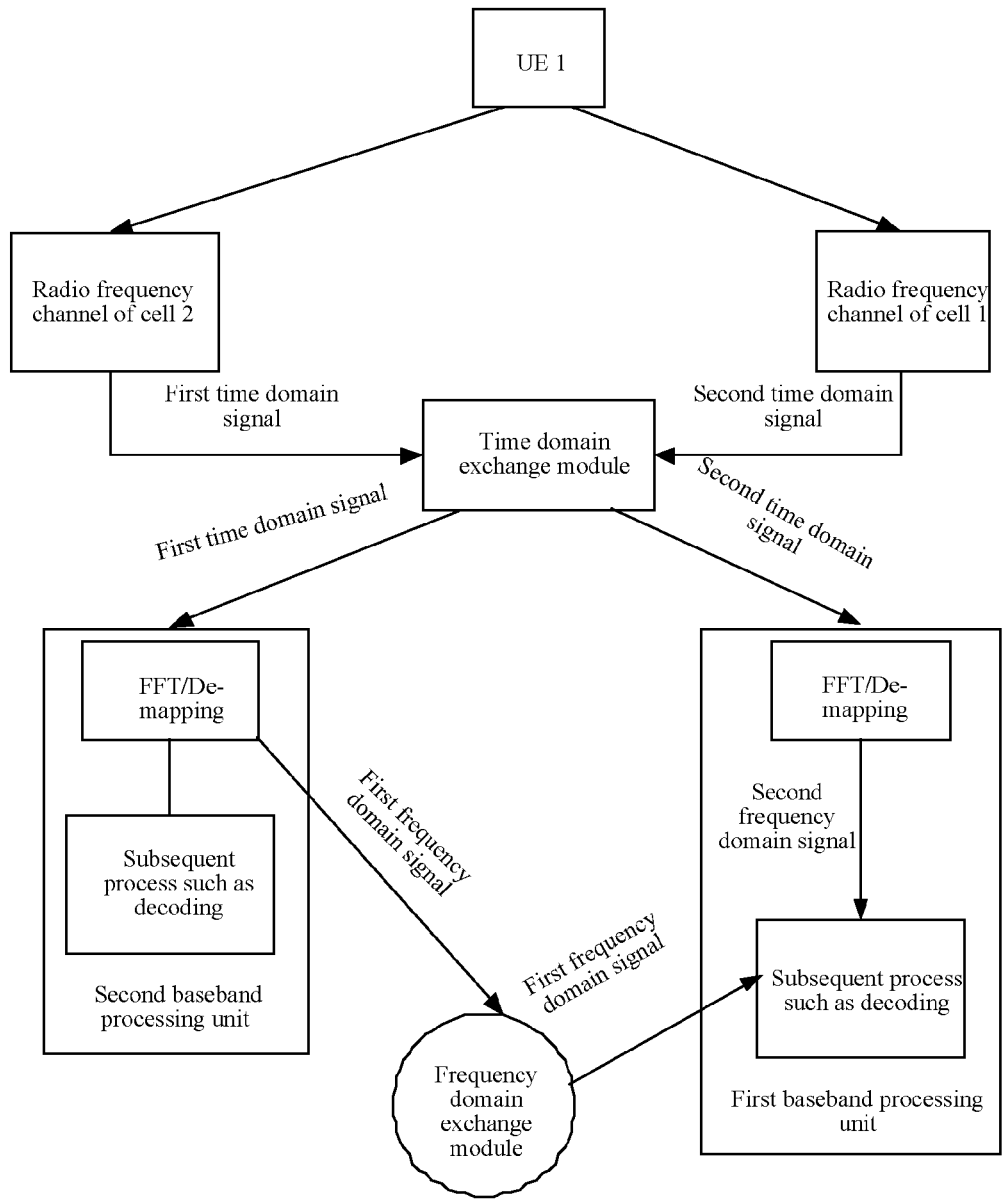
FIG. 4 is a schematic diagram of an application scenario according to another embodiment of the present invention.

FIG. 4 is a schematic diagram of an application scenario according to another embodiment of the present invention. In FIG. 4, cell 1 and cell 2 are coordinated cells for each other, a serving cell of UE 1 is cell 1, and a coordinated cell of UE 1 is cell 2. FIG. 4 is shown by using an example that a base station device includes a frequency domain exchange module, a time domain exchange module, and two baseband processing units, where the frequency domain exchange module is connected to each of the two baseband processing units, and the time domain exchange module is connected to each of the two baseband processing units. A first baseband processing unit of the two baseband processing units is a baseband processing unit that corresponds to cell 1; and a second baseband processing unit of the two baseband processing units is a baseband processing unit that corresponds to at least one coordinated cell of UE 1, that is, a baseband processing unit that corresponds to cell 2.

Figure 5:
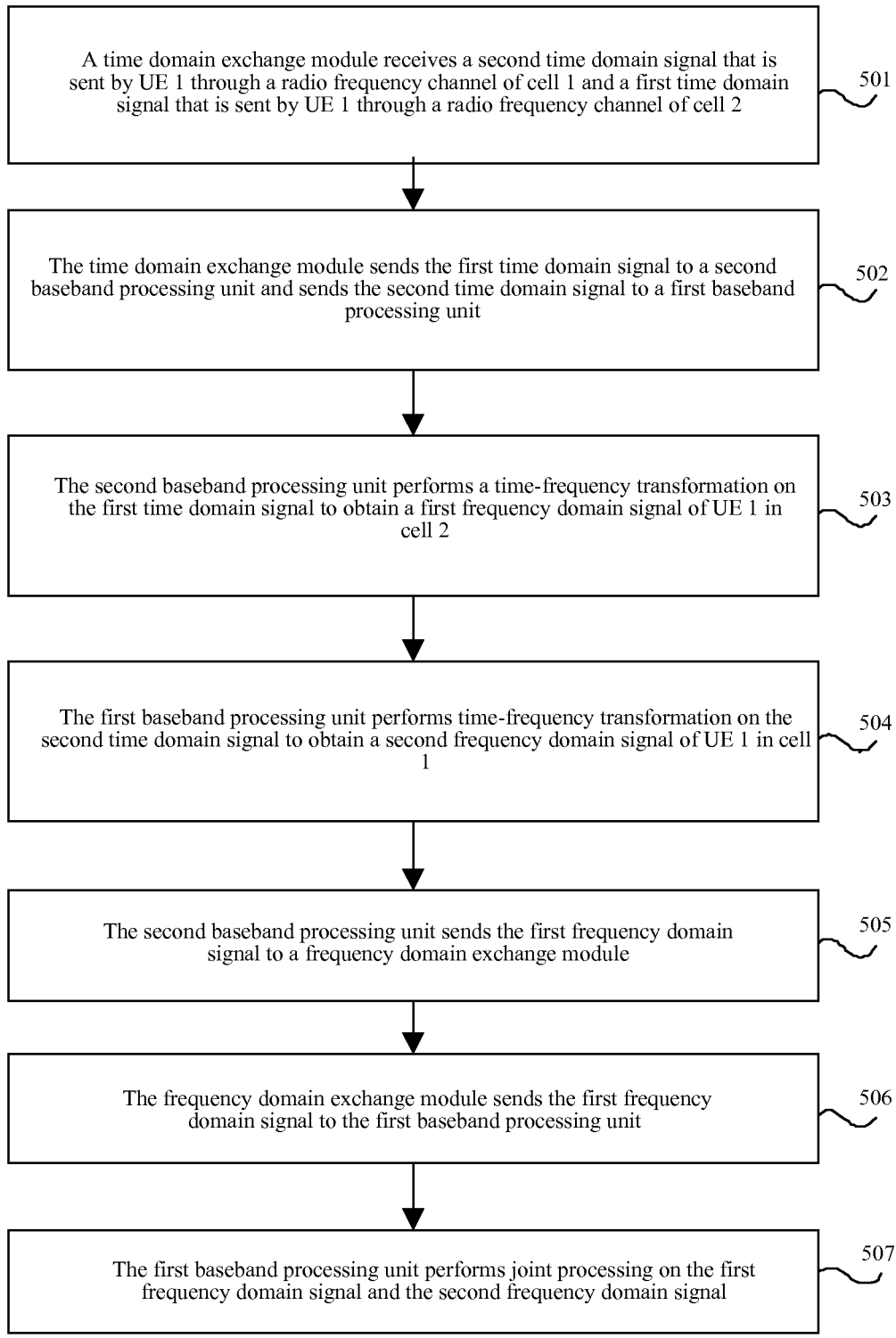
FIG. 5 is a flow chart of a signal sending method according to another embodiment of the present invention.

FIG. 5 is a flow chart of a signal sending method according to another embodiment of the present invention, and this embodiment is described by taking a CoMP process of UE 1 in FIG. 4 as an example.

As shown in FIG. 5, the signal sending method may include:

Step 501: A time domain exchange module receives a second time domain signal that is sent by UE 1 through a radio frequency channel of cell 1 and a first time domain signal that is sent by UE 1 through a radio frequency channel of cell 2.

Step 502: The time domain exchange module sends the first time domain signal to a second baseband processing unit and sends the second time domain signal to a first baseband processing unit.

Specifically, the time domain exchange module may send the first time domain signal to the second baseband processing unit and send the second time domain signal to the first baseband processing unit according to a predetermined coordination configuration.

In this embodiment, the predetermined coordination configuration may be configured for the time domain exchange module by a high layer (for example, a base station controller). The predetermined coordination configuration may be a signal sending relationship in which the second time domain signal that is sent by UE 1 through the radio frequency channel of cell 1 is sent to the first baseband processing unit and the first time domain signal that is sent by UE 1 through the radio frequency channel of cell 2 is sent to the second baseband processing unit.

Step 503: The second baseband processing unit performs a time-frequency transformation on the first time domain signal to obtain a first frequency domain signal of UE 1 in cell 2.

The second baseband processing unit may perform an FFT and a de-mapping processing on the first time domain signal, and obtain a first frequency domain signal of a first user equipment in cell 2 according to high-layer configuration information, where the high-layer configuration information includes a sub-carrier that is configured by a high layer (for example, a base station controller) and is used when UE 1 sends data.

Step 504: The first baseband processing unit performs a time-frequency transformation on the second time domain signal to obtain a second frequency domain signal of UE 1 in cell 1.

The first baseband processing unit may perform an FFT and a de-mapping processing on the second time domain signal, and obtain a second frequency domain signal of the first user equipment in cell 1 according to high-layer configuration information, where the high-layer configuration information includes a sub-carrier that is configured by a high layer (for example, a base station controller) and is used when UE 1 sends data.

Steps 505 to 507 are the same as steps 303 to 305.

In the present invention, implementation manner of the time domain exchange module is not limited. The time domain exchange module and the at least two baseband processing units may be located in the same baseband board of the base station device; or the time domain exchange module may be formed by at least two time domain exchange chips that are connected to each other, and the at least two time domain exchange chips are located in different baseband boards of the base station device; or the time domain exchange module may be independently disposed in the base station device, for example, the time domain exchange module is not disposed in any baseband board of the base station device.

Figure 6:
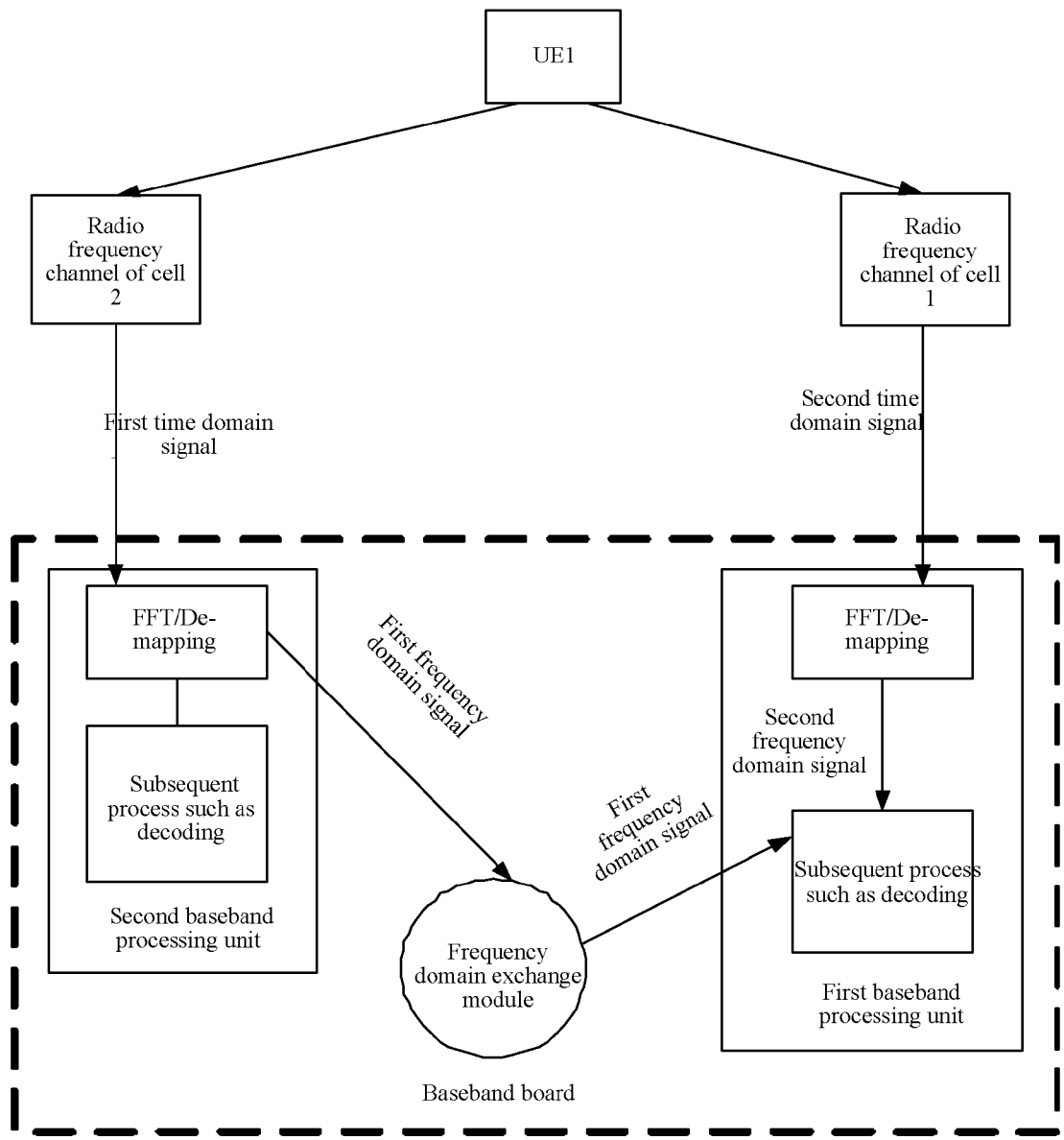
FIG. 6 is a schematic diagram of an application scenario according to another embodiment of the present invention.

In another implementation manner of the embodiment shown in FIG. 1 of the present invention, the frequency domain exchange module and the at least two baseband processing units are located in the same baseband board of the base station device. As shown in FIG. 6, FIG. 6 is a schematic diagram of an application scenario according to another embodiment of the present invention.

In FIG. 6, cell 1 and cell 2 are coordinated cells for each other, a serving cell of UE 1 is cell 1 and a coordinated cell of UE 1 is cell 2. FIG. 6 is shown by using an example that a base station device includes a frequency domain exchange module and two baseband processing units, where the frequency domain exchange module is connected to each of the two baseband processing units. A first baseband processing unit of the two baseband processing units is a baseband processing unit that corresponds to cell 1; and a second baseband processing unit of the two baseband processing units is a baseband processing unit that corresponds to at least one coordinated cell of UE 1, that is, a baseband processing unit that corresponds to cell 2.

In FIG. 6, the frequency domain exchange module, the first baseband processing unit, and the second baseband processing unit are located in the same baseband board of the base station device.

In the scenario shown in FIG. 6, for a CoMP process of UE 1, reference is made to the description in the embodiment shown in FIG. 3 of the present invention, and such details are not repeated for conciseness consideration.

In another implementation manner of the present invention, the frequency domain exchange module includes at least two frequency domain exchange chips that are connected to each other, and the at least two frequency domain exchange chips are located in different baseband boards of the base station device. In this way, the frequency domain exchange module receives a first frequency domain signal of a first user equipment, where the first frequency domain signal is obtained from at least one coordinated cell of the first user equipment and is sent by a baseband processing unit of the at least two baseband processing units, where the baseband processing unit corresponds to the at least one coordinated cell of the first user equipment, which may be: at least one frequency domain exchange chip of the at least two frequency domain exchange chips other than a first frequency domain exchange chip receives a first frequency domain signal of a first user equipment, where the first frequency domain signal is obtained from at least one coordinated cell of the first user equipment and is sent by a baseband processing unit that corresponds to the at least one coordinated cell of the first user equipment, where the first frequency domain exchange chip of the at least two frequency domain exchange chips and the first baseband processing unit are located in the same baseband board.

In this implementation manner, the frequency domain exchange module sends the first frequency domain signal to the first baseband processing unit of the at least two baseband processing units, where the first baseband processing unit corresponds to a serving cell of the first user equipment, which may be: the first frequency domain exchange chip receives a first frequency domain signal that is sent by the at least one frequency domain exchange chip, and then the first frequency domain exchange chip sends the first frequency domain signal to the first baseband processing unit.

Figure 7:
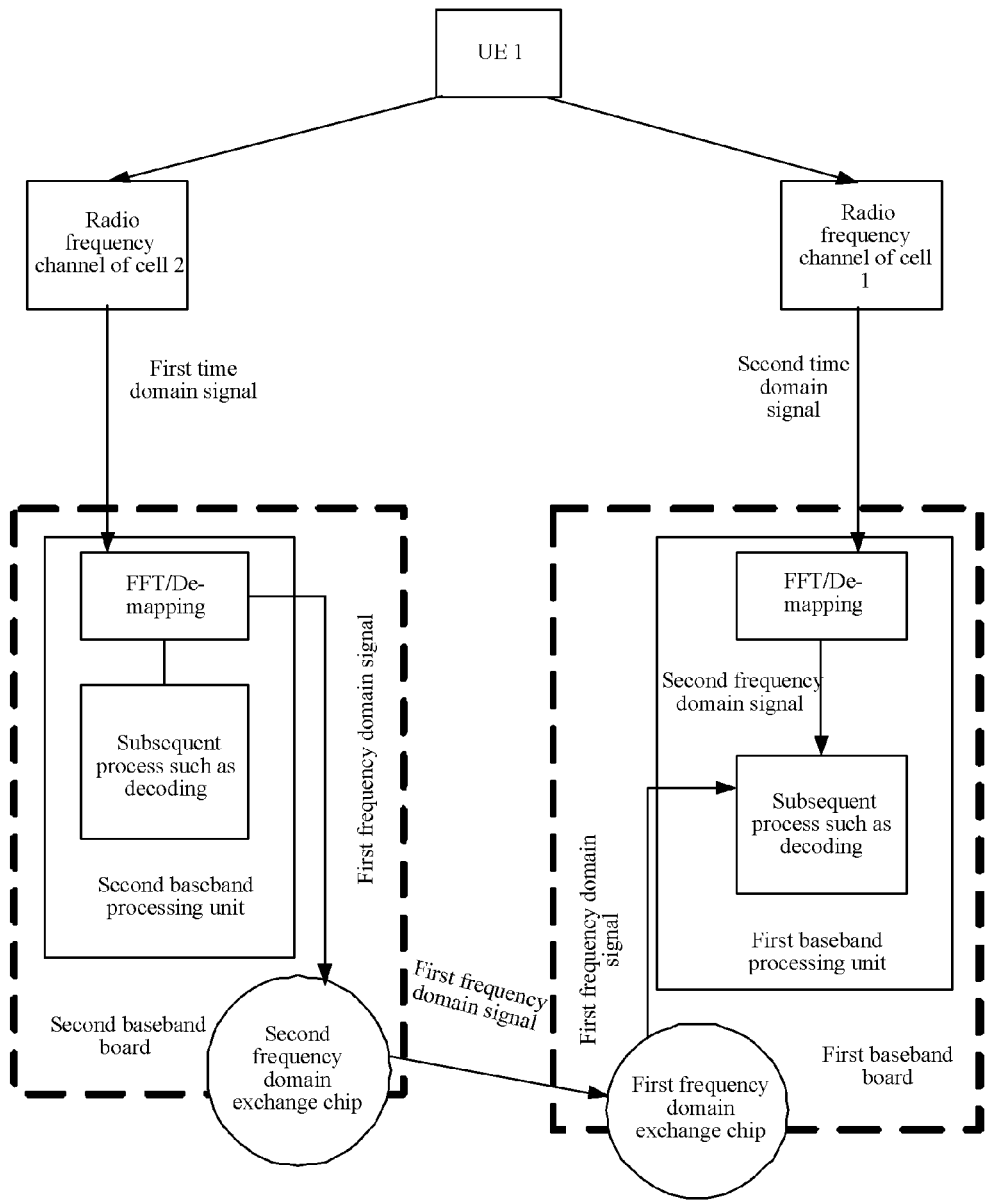
FIG. 7 is a schematic diagram of an application scenario according to another embodiment of the present invention.

FIG. 7 is a schematic diagram of an application scenario according to another embodiment of the present invention. In FIG. 7, cell 1 and cell 2 are coordinated cells for each other, a serving cell of UE 1 is cell 1, and a coordinated cell of UE 1 is cell 2. FIG. 7 is shown by using an example that a base station device includes a frequency domain exchange module and two baseband processing units. A first baseband processing unit of the two baseband processing units is a baseband processing unit that corresponds to cell 1; and a second baseband processing unit of the two baseband processing units is a baseband processing unit that corresponds to at least one coordinated cell of UE 1, that is, a baseband processing unit that corresponds to cell 2. In FIG. 7, the frequency domain exchange module is formed by two frequency domain exchange chips that are connected to each other. A first frequency domain exchange chip of the two frequency domain exchange chips is connected to the first baseband processing unit, and the first frequency domain exchange chip and the first baseband processing unit are located in the same baseband board, for example, a first baseband board in FIG. 7. A second frequency domain exchange chip of the two frequency domain exchange chips is connected to the second baseband processing unit, and the second frequency domain exchange chip and the first frequency domain exchange chip are located in different baseband boards. The second frequency domain exchange chip and the second baseband processing unit are located in a second baseband board in FIG. 7.

Figure 8:
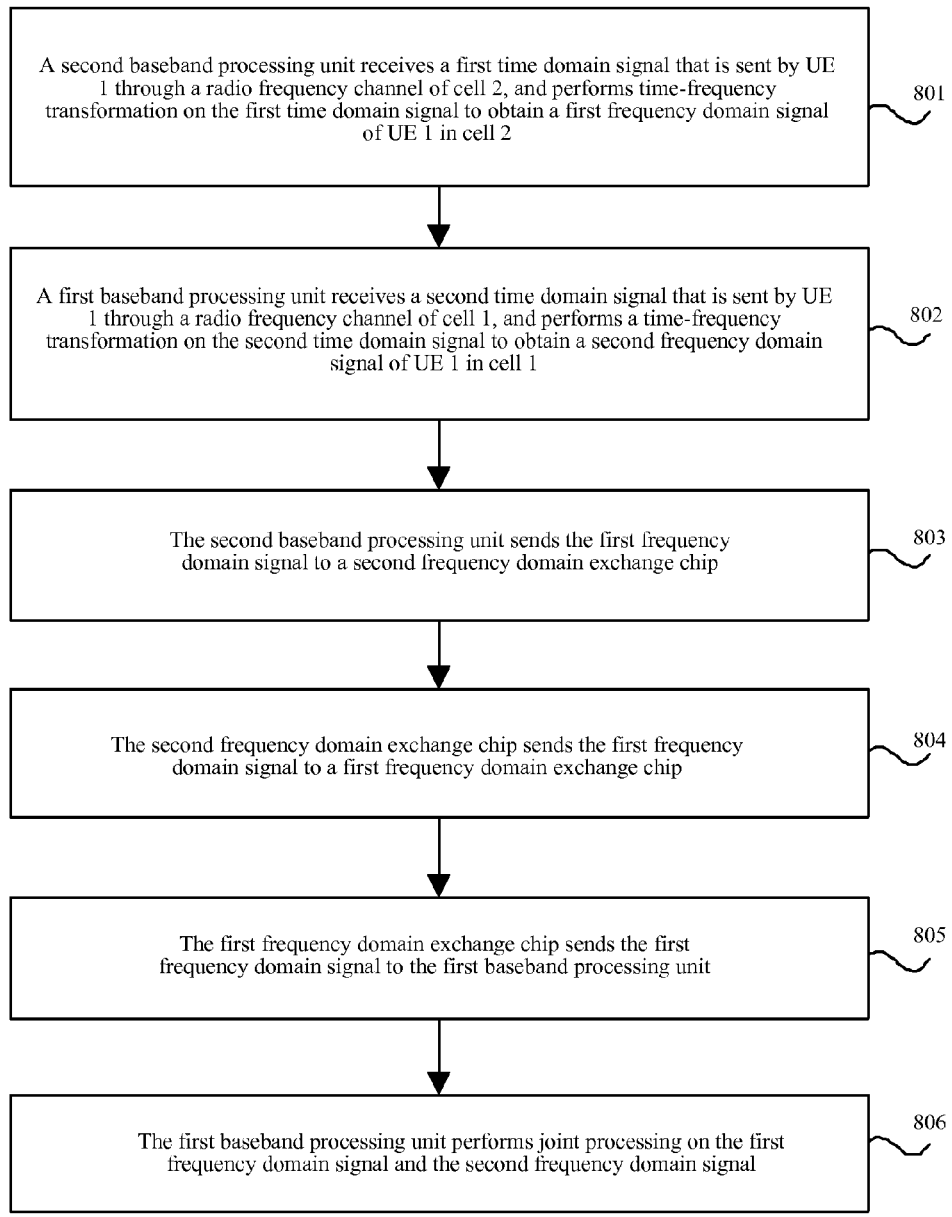
FIG. 8 is a flow chart of a signal sending method according to another embodiment of the present invention.

FIG. 8 is a flow chart of a signal sending method according to another embodiment of the present invention, and a CoMP process of UE 1 in FIG. 7 is described in this embodiment.

As shown in FIG. 8, the signal sending method may include:

Step 801: A second baseband processing unit receives a first time domain signal that is sent by UE 1 through a radio frequency channel of cell 2, and performs a time-frequency transformation on the first time domain signal to obtain a first frequency domain signal of UE 1 in cell 2.

The second baseband processing unit may perform an FFT and a de-mapping processing on the first time domain signal, and obtain a first frequency domain signal of a first user equipment in cell 2 according to high-layer configuration information, where the high-layer configuration information includes a sub-carrier that is configured by a high layer (for example, a base station controller) and is used when UE 1 sends data.

Step 802: A first baseband processing unit receives a second time domain signal that is sent by UE 1 through a radio frequency channel of cell 1, and performs a time-frequency transformation on the second time domain signal to obtain a second frequency domain signal of UE 1 in cell 1.

The first baseband processing unit may perform an FFT and a de-mapping processing on the second time domain signal, and obtain a second frequency domain signal of the first user equipment in cell 1 according to high-layer configuration information, where the high-layer configuration information includes a sub-carrier that is configured by a high layer (for example, a base station controller) and is used when UE 1 sends data.

Step 803: The second baseband processing unit sends the first frequency domain signal to a second frequency domain exchange chip.

Step 804: The second frequency domain exchange chip sends the first frequency domain signal to a first frequency domain exchange chip.

Specifically, after receiving the first frequency domain signal, the second frequency domain exchange chip finds that the first frequency domain signal is a frequency domain signal of UE 1 in cell 2, while a serving cell of UE1 is cell 1, a baseband processing unit that corresponds to cell 1 is the first baseband processing unit, and the first baseband processing unit is located in a first baseband board. Therefore, the second frequency domain exchange chip may send, according to a CoMP coordination relationship that is configured by a high layer (for example, a base station controller), the first frequency domain signal to the first frequency domain exchange chip that is located in the first baseband board.

The CoMP coordination relationship that is configured by the high layer may be a signal sending relationship in which the frequency domain signal of UE 1 in cell 2 is sent to a frequency domain exchange chip in a baseband board where the baseband processing unit that corresponds to cell 1 is located.

Step 805: The first frequency domain exchange chip sends the first frequency domain signal to the first baseband processing unit.

Step 806: The first baseband processing unit performs a joint processing on the first frequency domain signal and the second frequency domain signal.

For example, the first baseband processing unit may first perform a MIMO decoding and an equalization processing on the first frequency domain signal and the second frequency domain signal, and then perform a processing such as IDFT/demodulation/de-interleaving/HARQ combination/decoding/CRC.

In another implementation manner of the embodiment shown in FIG. 1 of the present invention, the first baseband processing unit is located in a first baseband board in a base station device; a baseband processing unit of the at least two baseband processing units, which corresponds to at least one coordinated cell of a first user equipment, is located in a baseband board other than the first baseband board in the base station device; and the frequency domain exchange module is independently disposed in the base station device, that is to say, the frequency domain exchange module is not disposed in any baseband board of the base station device.

Figure 9:
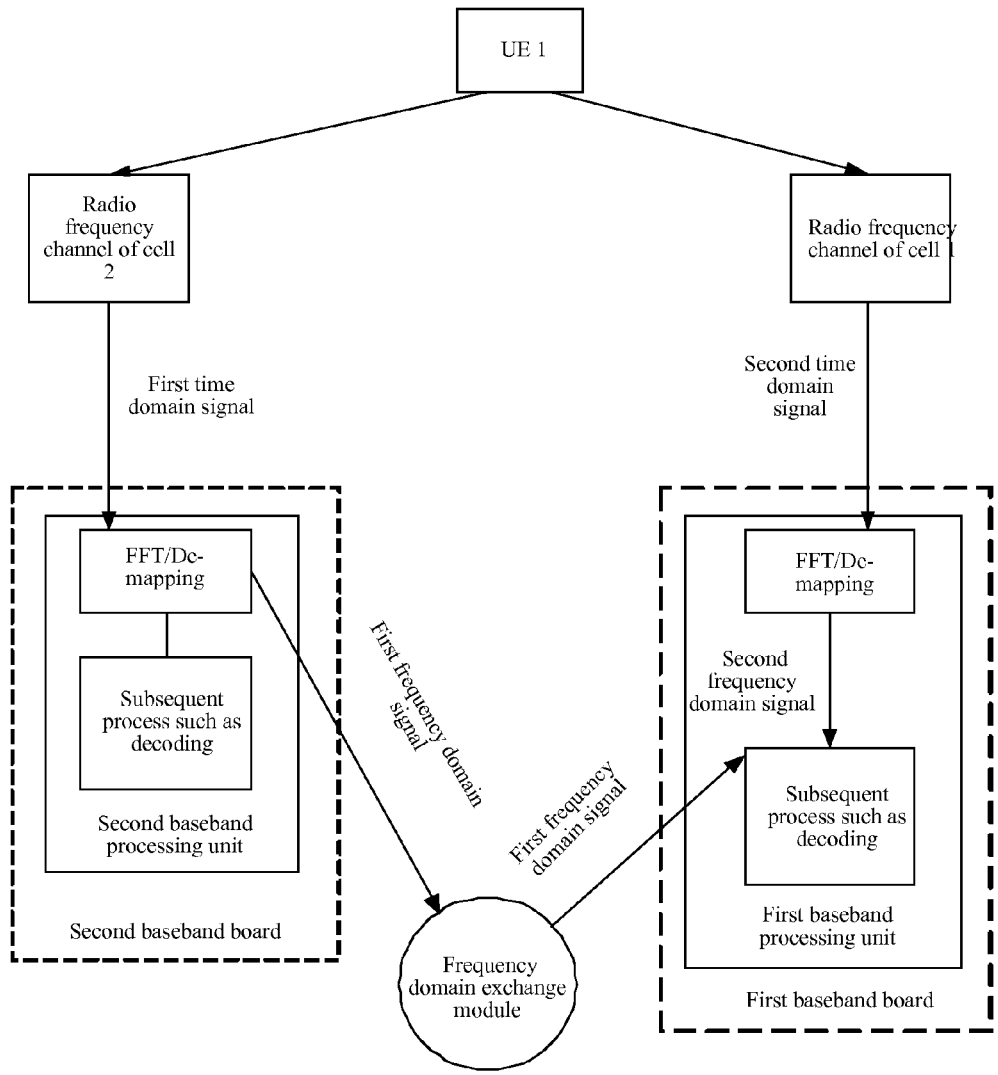
FIG. 9 is a schematic diagram of an application scenario according to another embodiment of the present invention.

FIG. 9 is a schematic diagram of an application scenario according to another embodiment of the present invention. In FIG. 9, cell 1 and cell 2 are coordinated cells for each other, a serving cell of UE 1 is cell 1, and a coordinated cell of UE 1 is cell 2. FIG. 9 is shown by using an example that a base station device includes a frequency domain exchange module and two baseband processing units. A first baseband processing unit of the two baseband processing units is a baseband processing unit that corresponds to cell 1; and a second baseband processing unit of the two baseband processing units is a baseband processing unit that corresponds to at least one coordinated cell of UE 1, that is, a baseband processing unit that corresponds to cell 2.

In FIG. 9, the first baseband processing unit is located in a first baseband board in the base station device, and the second baseband processing unit is located in a second baseband board in the base station device. The frequency domain exchange module is independently disposed in the base station device, that is, the frequency domain exchange module is not located in any baseband board of the base station device.

In the scenario shown in FIG. 9, for a CoMP process of UE 1, reference is made to the description in the embodiment shown in FIG. 3 of the present invention, and such details are not repeated for conciseness consideration.

Figure 10:
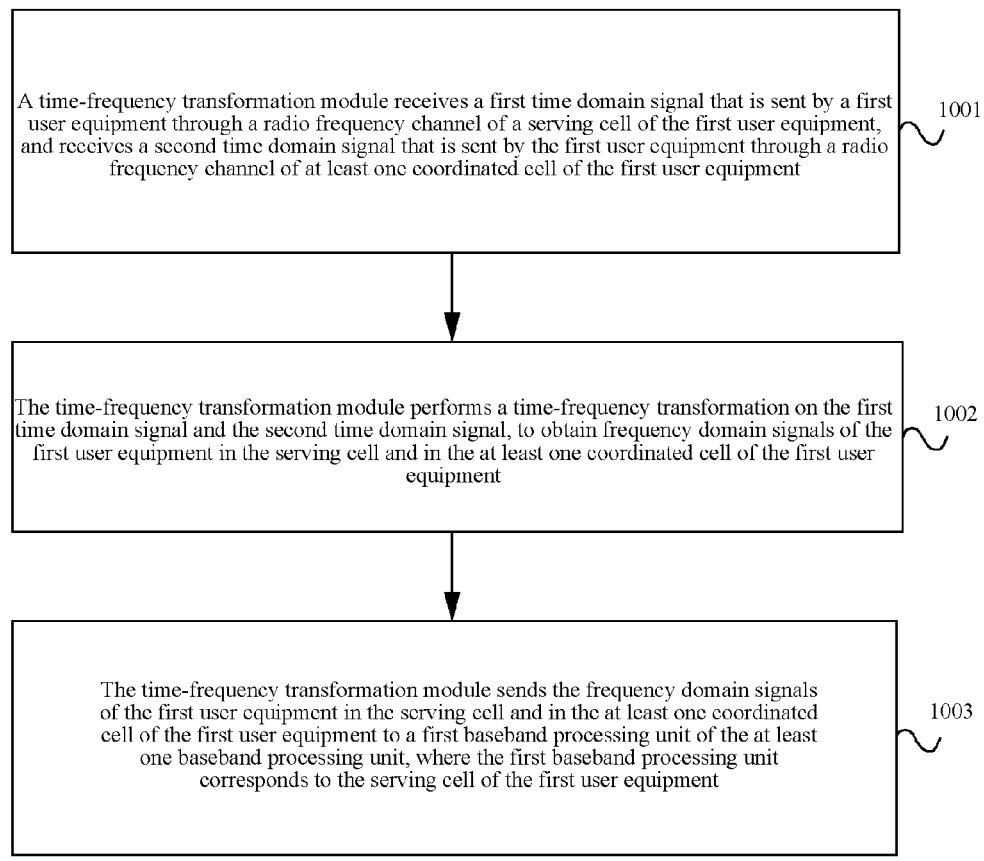
FIG. 10 is a flow chart of a signal sending method according to another embodiment of the present invention.

FIG. 10 is a flow chart of a signal sending method according to another embodiment of the present invention. The signal sending method provided in this embodiment may be applied in a base station device that includes a time-frequency transformation module and at least one baseband processing unit, and the time-frequency transformation module is connected to the at least one baseband processing unit.

As shown in FIG. 10, the signal sending method may include:

Step 1001: The time-frequency transformation module receives a first time domain signal that is sent by a first user equipment through a radio frequency channel of a serving cell of the first user equipment, and receives a second time domain signal that is sent by the first user equipment through a radio frequency channel of at least one coordinated cell of the first user equipment.

Step 1002: The time-frequency transformation module performs a time-frequency transformation on the first time domain signal and the second time domain signal, to obtain frequency domain signals of the first user equipment in the serving cell and in the at least one coordinated cell of the first user equipment.

Step 1003: The time-frequency transformation module sends the frequency domain signals of the first user equipment in the serving cell and in the at least one coordinated cell of the first user equipment to a first baseband processing unit of the at least one baseband processing unit, where the first baseband processing unit corresponds to the serving cell of the first user equipment.

In an implementation manner of this embodiment, the time-frequency transformation module may first send the frequency domain signals of the first user equipment in the serving cell and in the at least one coordinated cell of the first user equipment to a frequency domain exchange module that is connected to the time-frequency transformation module, and then the frequency domain exchange module sends the frequency domain signals of the first user equipment in the serving cell and in the at least one coordinated cell of the first user equipment to the first baseband processing unit. The time-frequency transformation module, the frequency domain exchange module, and the at least one baseband processing unit are located in the same baseband board of the base station device; or the first baseband processing unit is located in a first baseband board in the base station device, and the time-frequency transformation module and the frequency domain exchange module are independently disposed in the base station device, that is, the time-frequency transformation module and the frequency domain exchange module are not disposed in any baseband board in the base station device.

In the foregoing embodiment, after receiving the first time domain signal that is sent by the first user equipment through the radio frequency channel of the serving cell of the first user equipment and the second time domain signal that is sent by the first user equipment through the radio frequency channel of the at least one coordinated cell of the first user equipment, the time-frequency transformation module performs a time-frequency transformation on the first time domain signal and the second time domain signal, to obtain the frequency domain signals of the first user equipment in the serving cell and in the at least one coordinated cell of the first user equipment. Afterwards, the time-frequency transformation module sends the frequency domain signals of the first user equipment in the serving cell and in the at least one coordinated cell of the first user equipment to the first baseband processing unit of the at least one baseband processing unit, where the first baseband processing unit corresponds to the serving cell of the first user equipment. In this way, data exchange between a serving cell and a coordinated cell in an LTE-A system can be implemented, thereby effectively reducing influence of interference and improving the quality of a radio signal.

Figure 11:
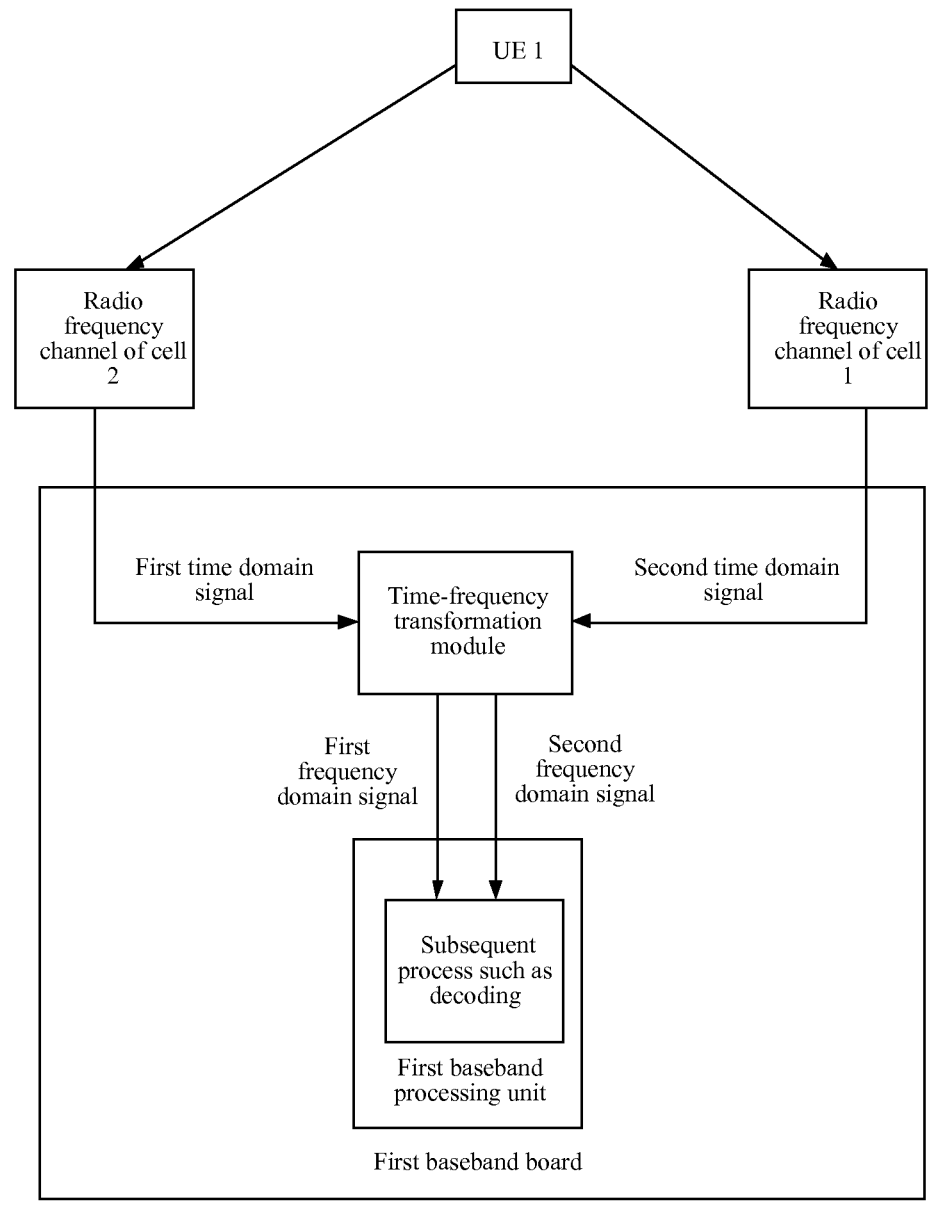
FIG. 11 is a schematic diagram of an application scenario according to another embodiment of the present invention.

In an implementation manner of the embodiment shown in FIG. 10 of the present invention, the time-frequency transformation module and the at least one baseband processing unit are located in the same baseband board of the base station device. As shown in FIG. 11, FIG. 11 is a schematic diagram of an application scenario according to another embodiment of the present invention.

In FIG. 11, cell 1 and cell 2 are coordinated cells for each other, a serving cell of UE 1 is cell 1 and a coordinated cell of UE 1 is cell 2. FIG. 11 is shown by using an example that a base station device includes a time-frequency transformation module and one baseband processing unit, and the one baseband processing unit is a first baseband processing unit that corresponds to a serving cell of a first user equipment. In FIG. 11, the first baseband processing unit and the time-frequency transformation module are located in a first baseband board in the base station device. In addition, in FIG. 11, a first frequency domain signal is a frequency domain signal of the first user equipment in cell 2, and a second frequency domain signal is a frequency domain signal of the first user equipment in cell 1.

In the scenario shown in FIG. 11, for a CoMP process of UE 1, reference is made to the description in the embodiment shown in FIG. 10 of the present invention, and such details are not repeated for conciseness consideration.

In the scenario shown in FIG. 11, through a frequency domain exchange module, a frequency domain signal in the first baseband board may also be sent in the first baseband board. That is to say, the time-frequency transformation module may first send the first frequency domain signal and the second frequency domain signal to the frequency domain exchange module that is connected to the time-frequency transformation module, and then the frequency domain exchange module sends the first frequency domain signal and the second frequency domain signal to the first baseband processing unit that is connected to the frequency domain exchange module. The time-frequency transformation module, the frequency domain exchange module, and the first baseband processing unit are located in the same baseband board (for example, the first baseband board in FIG. 11) of the base station device.

Figure 12:
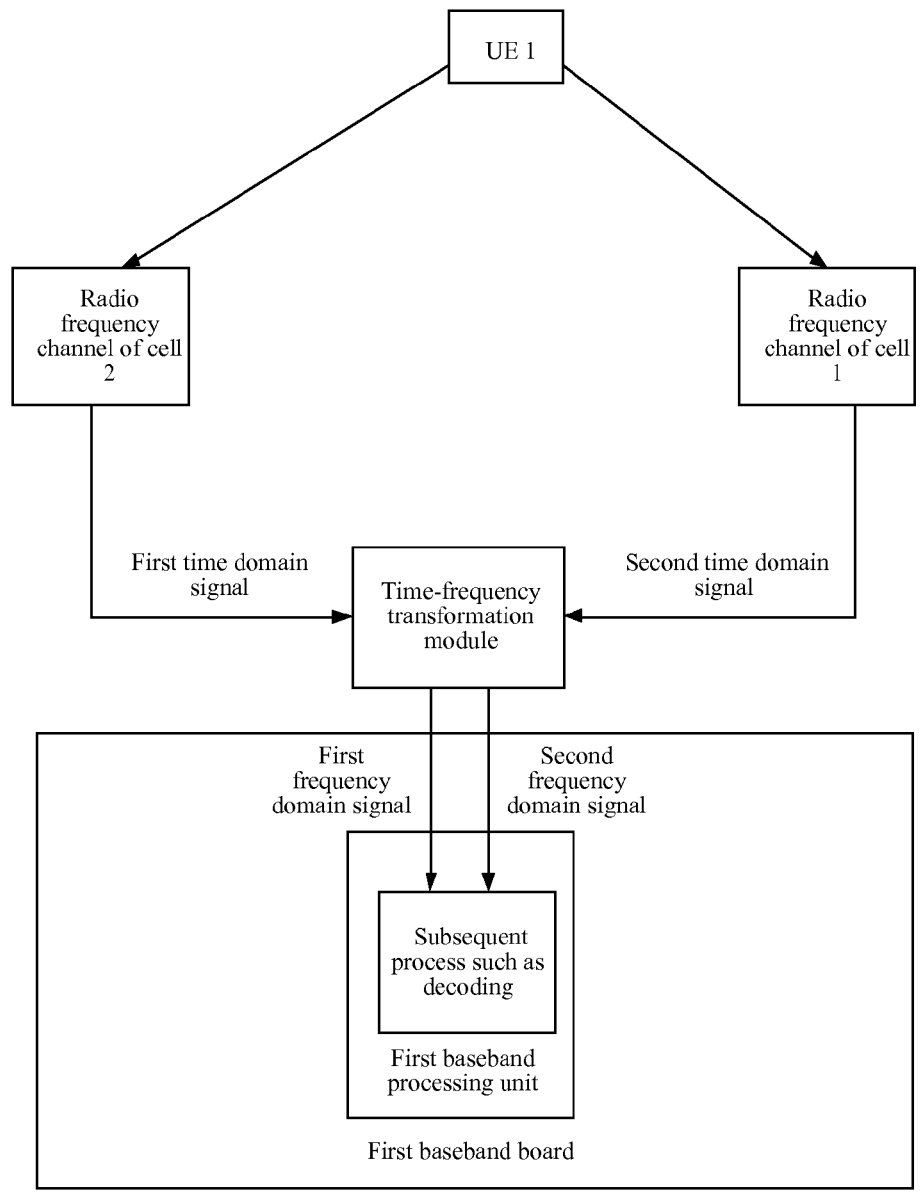
FIG. 12 is a schematic diagram of an application scenario according to another embodiment of the present invention.

In another implementation manner of the embodiment shown in FIG. 10 of the present invention, the first baseband processing unit is located in the first baseband board in the base station device, and the time-frequency transformation module is independently disposed in the base station device, that is to say, the time-frequency transformation module is not disposed in any baseband board of the base station device. As shown in FIG. 12, FIG. 12 is a schematic diagram of an application scenario according to another embodiment of the present invention.

In FIG. 12, cell 1 and cell 2 are coordinated cells for each other, a serving cell of UE 1 is cell 1 and a coordinated cell of UE 1 is cell 2. FIG. 12 is shown by using an example that a base station device includes a time-frequency transformation module and one baseband processing unit, and the one baseband processing unit is a first baseband processing unit that corresponds to a serving cell of a first user equipment. In FIG. 12, the first baseband processing unit is located in a first baseband board in the base station device, and the time-frequency transformation module is independently disposed in the base station device, that is, the time-frequency transformation module is not disposed in any baseband board of the base station device. In addition, in FIG. 12, a first frequency domain signal is a frequency domain signal of the first user equipment in cell 2, and a second frequency domain signal is a frequency domain signal of the first user equipment in cell 1.

In the scenario shown in FIG. 12, for a CoMP process of UE 1, reference is made to the description in the embodiment shown in FIG. 10 of the present invention, and such details are not repeated for conciseness consideration.

In the scenario shown in FIG. 12, the first frequency domain signal and the second frequency domain signal may also be sent to the first baseband processing unit through a frequency domain exchange module. That is to say, the time-frequency transformation module may first send the first frequency domain signal and the second frequency domain signal to the frequency domain exchange module that is connected to the time-frequency transformation module, and then the frequency domain exchange module sends the first frequency domain signal and the second frequency domain signal to the first baseband processing unit that is connected to the frequency domain exchange module. The first baseband processing unit is located in the first baseband board of the base station device, and the time-frequency transformation module and the frequency domain exchange module are independently disposed in the base station device, that is, the time-frequency transformation module and the frequency domain exchange module are not disposed in any baseband board in the base station device.

Persons of ordinary skill in the art may understand that all or part of the steps of the method embodiments may be implemented by a program instructing relevant hardware. The program may be stored in a computer readable storage medium. When the program runs, the steps of the method embodiments are performed. The storage medium may be any medium capable of storing program codes, such as a ROM, a RAM, a magnetic disk, or an optical disk.

Figure 13:
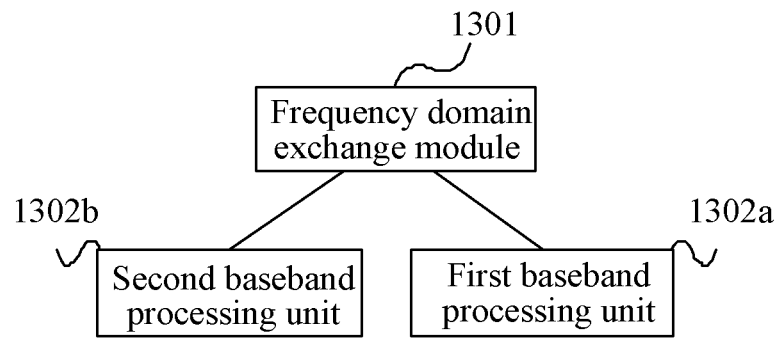
FIG. 13 is a schematic structural diagram of a base station device according to an embodiment of the present invention.

FIG. 13 is a schematic structural diagram of a base station device according to an embodiment of the present invention. In this embodiment, the base station device may implement a procedure in the embodiment shown in FIG. 1 of the present invention. As shown in FIG. 13, the base station device may include a frequency domain exchange module 1301 and at least two baseband processing units 1302, where the frequency domain exchange module 1301 is connected to each of the at least two baseband processing units 1302.

A baseband processing unit of the at least two baseband processing units 1302, which corresponds to at least one coordinated cell of a first user equipment, is configured to send a first frequency domain signal of the first user equipment to the frequency domain exchange module 1301, where the first frequency domain signal is obtained from the at least one coordinated cell of the first user equipment.

The frequency domain exchange module 1301 is configured to receive the first frequency domain signal, and send the first frequency domain signal to a first baseband processing unit of the at least two baseband processing units 1302, where the first baseband processing unit corresponds to a serving cell of the first user equipment.

The first baseband processing unit is configured to perform a joint processing on the first frequency domain signal and a second frequency domain signal of the first user equipment, where the second frequency domain signal is obtained from the serving cell of the first user equipment by the first baseband processing unit. For example, the first baseband processing unit may first perform a MIMO decoding and an equalization processing on the first frequency domain signal and the second frequency domain signal, and then perform a processing such as IDFT/demodulation/de-interleaving/HARQ combination/decoding/CRC.

Further, the baseband processing unit of the at least two baseband processing units 1302, which corresponds to the at least one coordinated cell of the first user equipment, is further configured to receive a first time domain signal that is sent by the first user equipment through a radio frequency channel of the at least one coordinated cell of the first user equipment, and perform a time-frequency transformation on the first time domain signal to obtain the first frequency domain signal.

Further, the first baseband processing unit is further configured to receive a second time domain signal that is sent by the first user equipment through a radio frequency channel of the serving cell of the first user equipment, and perform a time-frequency transformation on the second time domain signal to obtain the second frequency domain signal.

In this embodiment, the baseband processing unit may be a layer 1 (L1) processing chip.

FIG. 13 is shown by using an example that a base station device includes a frequency domain exchange module 1301 and two baseband processing units 1302, where the frequency domain exchange module 1301 is connected to each of the two baseband processing units 1302. A first baseband processing unit 1302*a* of the two baseband processing units 1302 is a baseband processing unit that corresponds to a serving cell of a first user equipment. A second baseband processing unit 1302*b* of the two baseband processing units 1302 is a baseband processing unit that corresponds to at least one coordinated cell of the first user equipment.

In the foregoing embodiment, after the frequency domain exchange module 1301 receives a first frequency domain signal of a first user equipment, where the first frequency domain signal is obtained from at least one coordinated cell of the first user equipment and is sent by a baseband processing unit of the at least two baseband processing units 1302 that is connected to the frequency domain exchange module 1301, where the baseband processing unit corresponds to the at least one coordinated cell of the first user equipment, the frequency domain exchange module 1301 sends the first frequency domain signal to the first baseband processing unit 1302*a* of the at least two baseband processing units 1302, where the first baseband processing unit 1302*a* corresponds to a serving cell of the first user equipment, so that the first baseband processing unit 1302*a* performs a joint processing on the first frequency domain signal and a second frequency domain signal of the first user equipment, where the second frequency domain signal is obtained from the serving cell of the first user equipment by the first baseband processing unit. In this way, data exchange between a serving cell and a coordinated cell in an LTE-A system can be implemented, thereby effectively reducing influence of interference and improving the quality of a radio signal.

Figure 14:
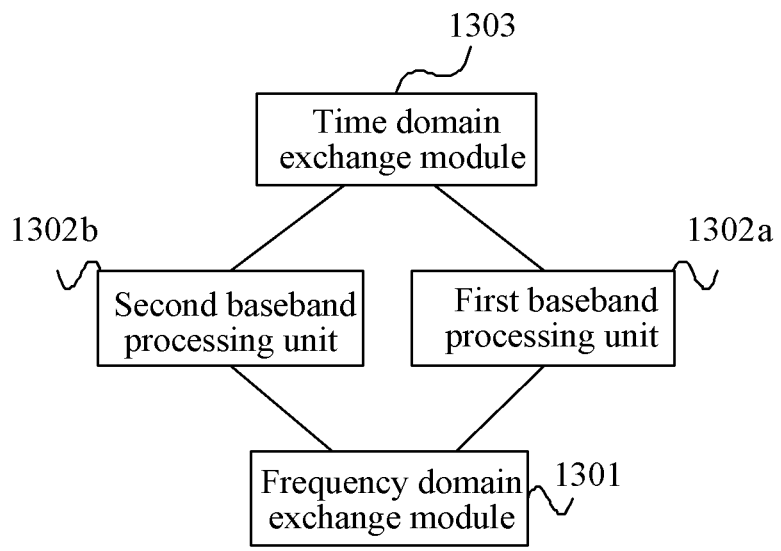
FIG. 14 is a schematic structural diagram of a base station device according to another embodiment of the present invention.

FIG. 14 is a schematic structural diagram of a base station device according to another embodiment of the present invention. The base station device in this embodiment may implement a procedure of the embodiment shown in FIG. 5 of the present invention. Compared with the base station device shown in FIG. 13, a difference lies in that, the base station device shown in FIG. 14 may further include: a time domain exchange module 1303, where the time domain exchange module 1303 is connected to each of at least two baseband processing units 1302.

The time domain exchange module 1303 is configured to receive a first time domain signal that is sent by a first user equipment through a radio frequency channel of at least one coordinated cell of the first user equipment, and send the first time domain signal to a baseband processing unit that corresponds to the at least one coordinated cell of the first user equipment.

The time domain exchange module 1303 is further configured to receive a second time domain signal that is sent by the first user equipment through a radio frequency channel of a serving cell of the first user equipment, and send the second time domain signal to a first baseband processing unit 1302*a*.

FIG. 14 is shown by using an example that a base station device includes a frequency domain exchange module 1301, two baseband processing units 1302, and a time domain exchange module 1303, where the frequency domain exchange module 1301 is connected to each of the two baseband processing units 1302, and the time domain exchange module 1303 is also connected to each of the two baseband processing units 1302. A first baseband processing unit 1302a of the two baseband processing units 1302 is a baseband processing unit that corresponds to a serving cell of a first user equipment. A second baseband processing unit 1302b of the two baseband processing units 1302 is a baseband processing unit that corresponds to at least one coordinated cell of the first user equipment.

In this embodiment, implementation manner of the time domain exchange module 1303 is not limited. The time domain exchange module 1303 and the at least two baseband processing units 1302 may be located in the same baseband board of the base station device; or the time domain exchange module 1303 may be formed by at least two time domain exchange chips that are connected to each other, and the at least two time domain exchange chips are located in different baseband boards of the base station device; or the time domain exchange module 1303 may be independently disposed in the base station device, for example, the time domain exchange module 1303 is not disposed in any baseband board of the base station device.

The base station device may implement data exchange between a serving cell and a coordinated cell in an LTE-A system, thereby effectively reducing influence of interference and improving the quality of a radio signal.

Figure 15:
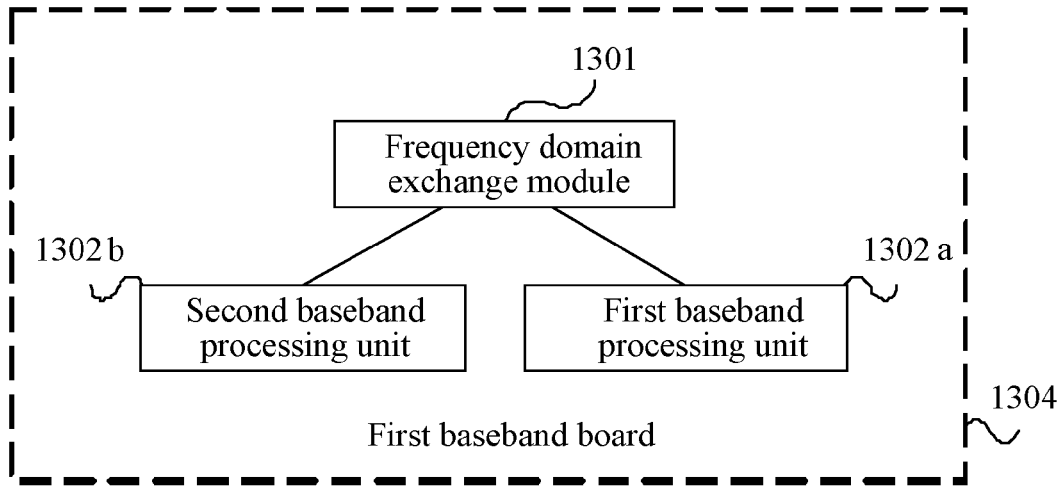
FIG. 15 is a schematic structural diagram of a base station device according to another embodiment of the present invention.

FIG. 15 is a schematic structural diagram of a base station device according to another embodiment of the present invention. Compared with the base station device shown in FIG. 13, a difference lies in that, in the base station device shown in FIG. 15, a frequency domain exchange module 1301 and at least two baseband processing units 1302 are located in the same baseband board of the base station device.

FIG. 15 is shown by using an example that a base station device includes a frequency domain exchange module 1301 and two baseband processing units 1302, where the frequency domain exchange module 1301 is connected to each of the two baseband processing units 1302. A first baseband processing unit 1302a of the two baseband processing units 1302 is a baseband processing unit that corresponds to a serving cell of a first user equipment. A second baseband processing unit 1302b of the two baseband processing units 1302 is a baseband processing unit that corresponds to at least one coordinated cell of the first user equipment. As shown in FIG. 15, the frequency domain exchange module 1301, the first baseband processing unit 1302a, and the second baseband processing unit 1302b are located in a first baseband board 1304 of the base station device.

The base station device may implement data exchange between a serving cell and a coordinated cell in an LTE-A system, thereby effectively reducing influence of interference and improving the quality of a radio signal.

Figure 16:
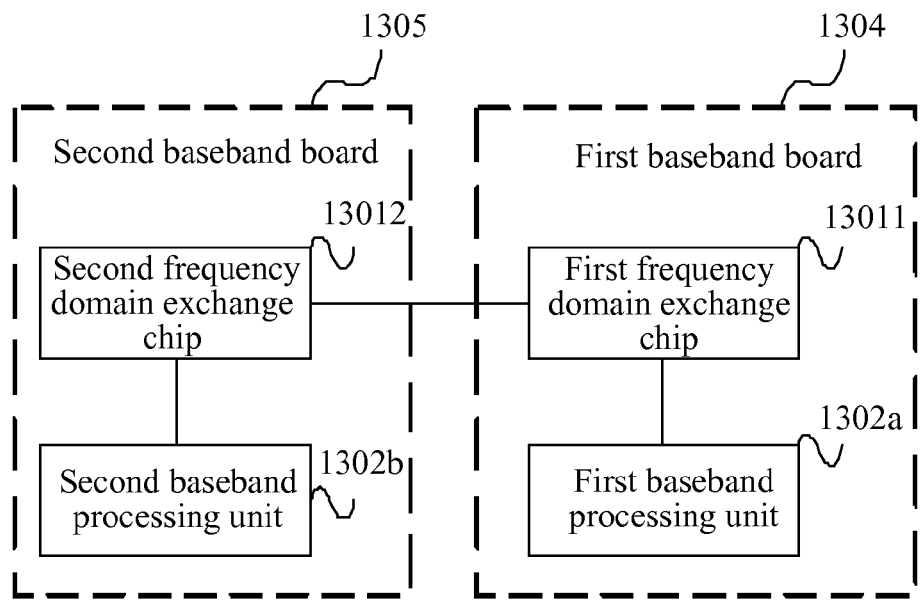
FIG. 16 is a schematic structural diagram of a base station device according to another embodiment of the present invention.

FIG. 16 is a schematic structural diagram of a base station device according to another embodiment of the present invention. The base station device in this embodiment may implement a procedure of the embodiment shown in FIG. 8 of the present invention. Compared with the base station device shown in FIG. 13, a difference lies in that, in the base station device shown in FIG. 16, a frequency domain exchange module 1301 may include at least two frequency domain exchange chips that are connected to each other. The at least two frequency domain exchange chips are located in different baseband boards in the base station device, and a first frequency domain exchange chip of the at least two frequency domain exchange chips and a first baseband processing unit are located in the same baseband board.

At least one frequency domain exchange chip of the at least two frequency domain exchange chips other than the first frequency domain exchange chip is configured to receive a first frequency domain signal of a first user equipment, where the first frequency domain signal is obtained from at least one coordinated cell of the first user equipment and is sent by a baseband processing unit that corresponds to the at least one coordinated cell of the first user equipment.

The first frequency domain exchange chip is configured to receive the first frequency domain signal sent by the at least one frequency domain exchange chip, and send the first frequency domain signal to the first baseband processing unit.

FIG. 16 is shown by using an example that a base station device includes a frequency domain exchange module 1301 and two baseband processing units 1302, where the frequency domain exchange module 1301 is connected to each of the two baseband processing units 1302. A first baseband processing unit 1302a of the two baseband processing units 1302 is a baseband processing unit that corresponds to a serving cell of a first user equipment. A second baseband processing unit 1302b of the two baseband processing units 1302 is a baseband processing unit that corresponds to at least one coordinated cell of the first user equipment. Moreover, FIG. 16 is shown by using an example that the frequency domain exchange module 1301 includes two frequency domain exchange chips that are connected to each other. In FIG. 16, the two frequency domain exchange chips are a first frequency domain exchange chip 13011 and a second frequency domain exchange chip 13012 respectively.

The first frequency domain exchange chip 13011 and the first baseband processing unit 1302a are located in a first baseband board 1304 of the base station device, and the second frequency domain exchange chip 13012 and the second baseband processing unit 1302b are located in a second baseband board 1305 of the base station device.

The base station device may implement data exchange between a serving cell and a coordinated cell in an LTE-A system, thereby effectively reducing influence of interference and improving the quality of a radio signal.

Figure 17:
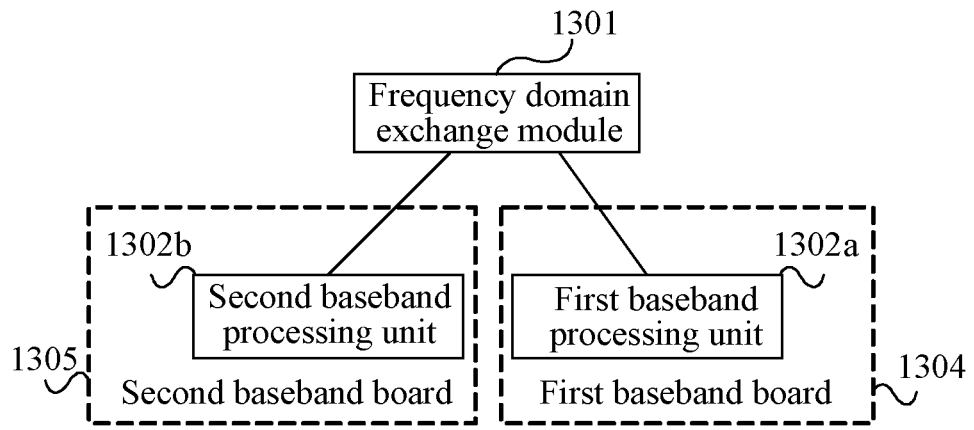
FIG. 17 is a schematic structural diagram of a base station device according to another embodiment of the present invention.

FIG. 17 is a schematic structural diagram of a base station device according to another embodiment of the present invention. Compared with the base station device shown in FIG. 13, a difference lies in that, in the base station device shown in FIG. 17, a first baseband processing unit is located in a first baseband board of the base station device, a baseband processing unit of at least two baseband processing units 1302, which corresponds to at least one coordinated cell of a first user equipment is located in a baseband board other than the first baseband board in the base station device, and a frequency domain exchange module 1301 is independently disposed in the base station device.

FIG. 17 is shown by using an example that a base station device includes a frequency domain exchange module 1301 and two baseband processing units 1302, where the frequency domain exchange module 1301 is connected to each of the two baseband processing units 1302. A first baseband processing unit 1302a of the two baseband processing units 1302 is a baseband processing unit that corresponds to a serving cell of a first user equipment. A second baseband processing unit 1302b of the two baseband processing units 1302 is a baseband processing unit that corresponds to at least one coordinated cell of the first user equipment.

As shown in FIG. 17, the first baseband processing unit 1302a is located in the first baseband board 1304 in the base station device, the second baseband processing unit 1302b is located in the second baseband board 1305 in the base station device, and the frequency domain exchange module 1301 is independently disposed in the base station device, that is to say, the frequency domain exchange module 1301 is not disposed in any baseband board of the base station device.

The base station device may implement data exchange between a serving cell and a coordinated cell in an LTE-A system, thereby effectively reducing influence of interference and improving the quality of a radio signal.

Figure 18:
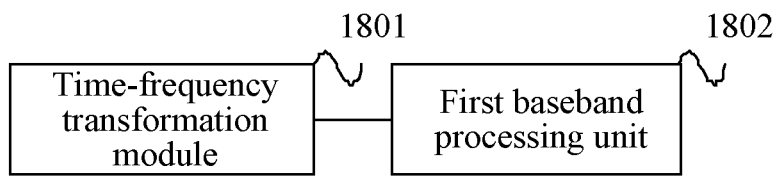
FIG. 18 is a schematic structural diagram of a base station device according to another embodiment of the present invention.

FIG. 18 is a schematic structural diagram of a base station device according to another embodiment of the present invention. The base station device in this embodiment may implement a procedure of the embodiment shown in FIG. 10 of the present invention. As shown in FIG. 18, the base station device may include: a time-frequency transformation module 1801 and at least one baseband processing unit 1802, where the time-frequency transformation module 1801 is connected to the at least one baseband processing unit 1802.

The time-frequency transformation module 1801 is configured to receive a first time domain signal that is sent by a first user equipment through a radio frequency channel of a serving cell of the first user equipment, receive a second time domain signal that is sent by the first user equipment through a radio frequency channel of at least one coordinated cell of the first user equipment, perform a time-frequency transformation on the first time domain signal and the second time domain signal to obtain frequency domain signals of the first user equipment in the serving cell and in the at least one coordinated cell of the first user equipment, and send the frequency domain signals of the first user equipment in the serving cell and in the at least one coordinated cell of the first user equipment to a first baseband processing unit of the at least one baseband processing unit 1802, where the first baseband processing unit corresponds to the serving cell of the first user equipment.

The first baseband processing unit is configured to receive the frequency domain signals of the first user equipment in the serving cell and in the at least one coordinated cell of the first user equipment, where the frequency domain signals are sent by the time-frequency transformation module 1801, and perform a joint processing on the frequency domain signals. For example, the first baseband processing unit may first perform a MIMO decoding and an equalization processing on the frequency domain signals, and then perform a processing such as IDFT/demodulation/de-interleaving/HARQ combination/decoding/CRC.

FIG. 18 is described by using an example that a base station device includes a time-frequency transformation module 1801 and one baseband processing unit 1802. The time-frequency transformation module 1801 is connected to the one baseband processing unit 1802, and the one baseband processing unit 1802 is a first baseband processing unit 1802 that corresponds to a serving cell of a first user equipment.

In the foregoing embodiment, the time-frequency transformation module 1801 receives a first time domain signal that is sent by a first user equipment through a radio frequency channel of a serving cell of the first user equipment, receives a second time domain signal that is sent by the first user equipment through a radio frequency channel of at least one coordinated cell of the first user equipment, and then performs time-frequency transformation on the first time domain signal and the second time domain signal to obtain frequency domain signals of the first user equipment in the serving cell and in the at least one coordinated cell of the first user equipment; and afterwards, the time-frequency transformation module 1801 sends the frequency domain signals of the first user equipment in the serving cell and in the at least one coordinated cell of the first user equipment to a first baseband processing unit of the at least one baseband processing unit 1802, where the first baseband processing unit corresponds to the serving cell of the first user equipment. In this way, data exchange between a serving cell and a coordinated cell in an LTE-A system can be implemented, thereby effectively reducing influence of interference and improving the quality of a radio signal.

Figure 19:
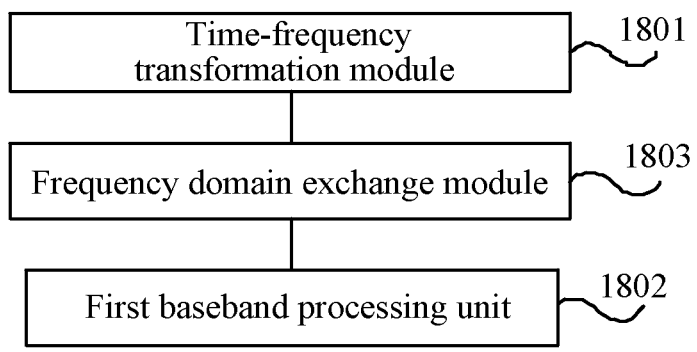
FIG. 19 is a schematic structural diagram of a base station device according to another embodiment of the present invention.

FIG. 19 is a schematic structural diagram of a base station device according to another embodiment of the present invention. Compared with the base station device shown in FIG. 18, a difference lies in that, the base station device shown in FIG. 19 may further include a frequency domain exchange module 1803, where the frequency domain exchange module 1803 is connected to a time-frequency transformation module 1801.

The time-frequency transformation module 1801 is specifically configured to send frequency domain signals of a first user equipment in a serving cell and in at least one coordinated cell of the first user equipment to the frequency domain exchange module 1803.

The frequency domain exchange module 1803 is connected to a first baseband processing unit 1802 and is configured to send the frequency domain signals of the first user equipment in the serving cell and in the at least one coordinated cell of the first user equipment to the first baseband processing unit 1802.

FIG. 19 is described by using an example that a base station device includes a time-frequency transformation module 1801, one baseband processing unit 1802, and a frequency domain exchange module 1803. The time-frequency transformation module 1801 is connected to the one baseband processing unit 1802, and the frequency domain exchange module 1803 is also connected to the one baseband processing unit 1802. The one baseband processing unit 1802 is a first baseband processing unit 1802 that corresponds to a serving cell of a first user equipment.

The base station device may implement data exchange between a serving cell and a coordinated cell in an LTE-A system, thereby effectively reducing influence of interference and improving the quality of a radio signal.

Figure 20:
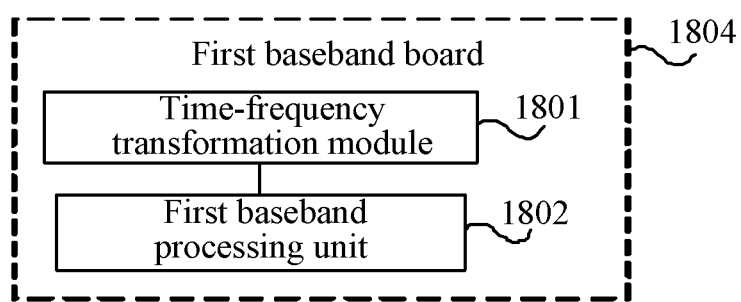
FIG. 20 is a schematic structural diagram of a base station device according to another embodiment of the present invention.

FIG. 20 is a schematic structural diagram of a base station device according to another embodiment of the present invention. Compared with the base station device shown in FIG. 18, a difference lies in that, in the base station device shown in FIG. 20, a time-frequency transformation module 1801 and at least one baseband processing unit 1802 are located in the same baseband board of the base station device.

FIG. 20 is described by using an example that a base station device includes a time-frequency transformation module 1801 and one baseband processing unit 1802. The time-frequency transformation module 1801 is connected to the one baseband processing unit 1802, and the one baseband processing unit 1802 is a first baseband processing unit 1802 that corresponds to a serving cell of a first user equipment.

As shown in FIG. 20, the time-frequency transformation module 1801 and the first baseband processing unit 1802 are located in a first baseband board 1804 of the base station device.

Figure 21:
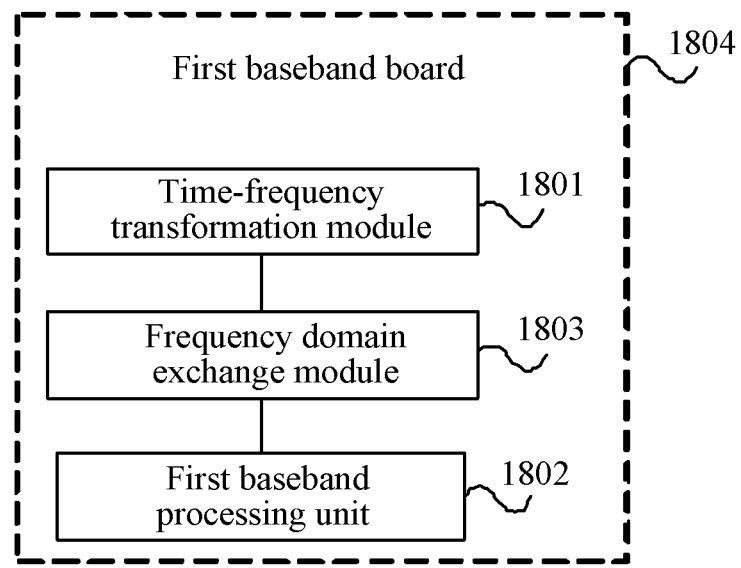
FIG. 21 is a schematic structural diagram of a base station device according to another embodiment of the present invention.

FIG. 21 is a schematic structural diagram of a base station device according to another embodiment of the present invention. Compared with the base station device shown in FIG. 19, a difference lies in that, in the base station device shown in FIG. 21, a time-frequency transformation module 1801, a frequency domain exchange module 1803, and at least one baseband processing unit 1802 are located in the same baseband board of the base station device.

FIG. 21 is described by using an example that a base station device includes a time-frequency transformation module 1801, one baseband processing unit 1802, and a frequency domain exchange module 1803. The time-frequency transformation module 1801 is connected to the one baseband processing unit 1802, and the frequency domain exchange module 1803 is also connected to the one baseband processing unit 1802. The one baseband processing unit 1802 is a first baseband processing unit 1802 that corresponds to a serving cell of a first user equipment.

As shown in FIG. 21, the time-frequency transformation module 1801, the first baseband processing unit 1802, and the frequency domain exchange module 1803 are located in a first baseband board 1804 of the base station device.

Figure 22:
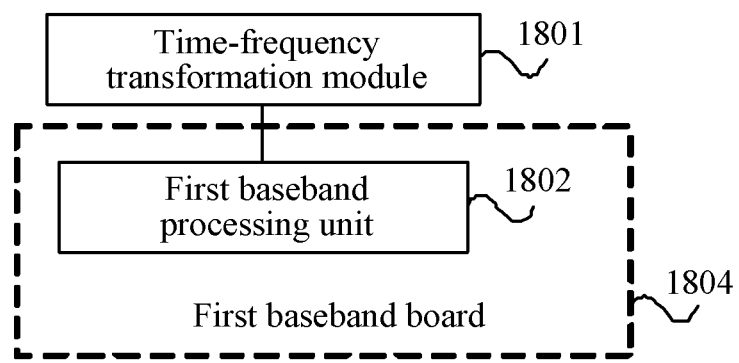
FIG. 22 is a schematic structural diagram of a base station device according to another embodiment of the present invention.

FIG. 22 is a schematic structural diagram of a base station device according to another embodiment of the present invention. Compared with the base station device shown in FIG. 18, a difference lies in that, in the base station device shown in FIG. 22, a first baseband processing unit 1802 is located in a first baseband board 1804 in the base station device and a time-frequency transformation module 1801 is independently disposed in the base station device, that is to say, the time-frequency transformation module 1801 is not disposed in any baseband board of the base station device.

FIG. 22 is described by using an example that a base station device includes a time-frequency transformation module 1801 and one baseband processing unit 1802. The time-frequency transformation module 1801 is connected to the one baseband processing unit 1802, and the one baseband processing unit 1802 is a first baseband processing unit 1802 that corresponds to a serving cell of a first user equipment.

As shown in FIG. 22, the first baseband processing unit 1802 is located in the first baseband board 1804 of the base station device. The time-frequency transformation module 1801 is independently disposed in the base station device, that is to say, the time-frequency transformation module 1801 is not disposed in any baseband board of the base station device.

Figure 23:
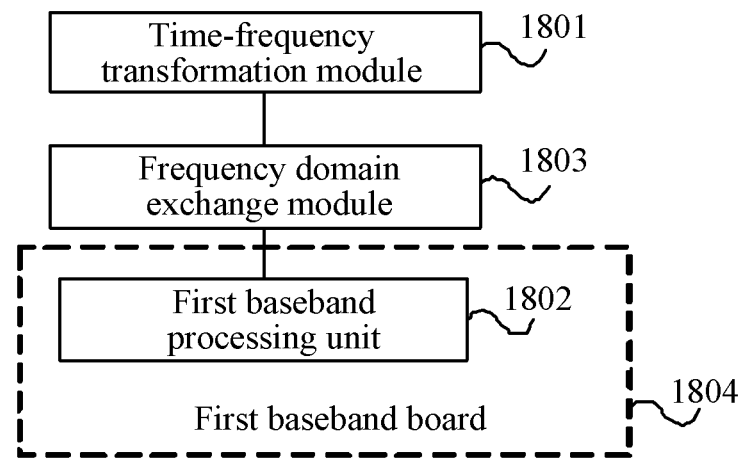
FIG. 23 is a schematic structural diagram of a base station device according to another embodiment of the present invention.

FIG. 23 is a schematic structural diagram of a base station device according to another embodiment of the present invention. Compared with the base station device shown in FIG. 19, a difference lies in that, in the base station device shown in FIG. 23, a first baseband processing unit 1802 is located in a first baseband board 1804 in the base station device, and a time-frequency transformation module 1801 and a frequency domain exchange module 1803 are independently disposed in the base station device, that is to say, the time-frequency transformation module 1801 and the frequency domain exchange module 1803 are not disposed in any baseband board of the base station device.

FIG. 23 is described by using an example that a base station device includes a time-frequency transformation module 1801, one baseband processing unit 1802, and a frequency domain exchange module 1803. The time-frequency transformation module 1801 is connected to the one baseband processing unit 1802, and the frequency domain exchange module 1803 is also connected to the one baseband processing unit 1802. The one baseband processing unit 1802 is a first baseband processing unit 1802 that corresponds to a serving cell of a first user equipment.

As shown in FIG. 23, the first baseband processing unit 1802 is located in the first baseband board 1804 of the base station device. The time-frequency transformation module 1801 and the frequency domain exchange module 1803 are independently disposed in the base station device, that is to say, the time-frequency transformation module 1801 and the frequency domain exchange module 1803 are not disposed in any baseband board of the base station device.

It should be understood by persons skilled in the art that the accompanying drawings are merely schematic diagrams of one exemplary embodiment, and modules or procedures in the accompanying drawings are not necessarily required in implementing the present invention.

Persons skilled in the art may understand that the modules in the devices provided in the embodiments may be arranged in the devices in a distributed manner according to the description of the embodiments, or may be arranged in one or multiple devices which are different from those described in the embodiments. The modules in the foregoing embodiments may be combined into one module, and may also be split into multiple submodules.

Finally, it should be noted that the foregoing embodiments are merely provided for describing the technical solutions of the present invention, but are not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some or all technical features in the technical solutions, as long as such modifications or replacements do not cause the essence of corresponding technical solutions to depart from the scope of the technical solutions in the embodiments of the present invention.

What is claimed is:

1. A system, comprising:
a base station (BS); and
a user equipment (UE), the BS capable of communicating with the UE via a serving cell and a coordinated cell, the BS comprising a frequency exchange module coupled with a first baseband processing unit and a second baseband processing unit, the first baseband processing unit designated for supporting baseband processing related to the coordinated cell, the second baseband processing unit designated for supporting baseband processing related to the serving cell, wherein the first baseband processing unit is configured to perform fast Fourier transformation (FFT) and de-mapping processing on a first time domain signal and obtain a first frequency domain signal of the UE in the coordinated cell according to first high-layer configuration information, wherein the first high-layer configuration information comprises a first sub-carrier that is configured by the high layer and is used when the UE sends data;

the frequency exchange module is configured to:
receive the first frequency domain signal from the first baseband processing unit; and
forward the first frequency domain signal to the second baseband processing unit; and the second baseband processing unit is configured to:
perform fast Fourier transformation, FFT, and de-mapping processing on a second time domain signal;
obtain the second frequency domain signal of the UE in the serving cell according to second high-layer configuration information, wherein the second high-layer configuration information comprises a second sub-carrier that is configured by a high layer and is used when the UE sends data;
receive the first frequency domain signal from the frequency exchange module; and
perform a joint processing on the first frequency domain signal and the second frequency domain signal.

2. The system of claim 1, wherein the joint processing comprises a multiple input multiple output (MIMO) decoding and an equalization of the first frequency domain signal and the second frequency domain signal for the UE.

3. The system of claim 1, wherein the BS further comprises a time domain exchange module coupled with the first baseband processing unit and the second baseband processing unit, and the time domain exchange module is configured to:
receive a first time domain signal via the coordinated cell, the first time domain signal derived from the signal sent by the UE;
forward the first time domain signal to the first baseband processing unit;
receive a second time domain signal via the serving cell, the second time domain signal derived from the signal sent by the UE; and
forward the second time domain signal to the second baseband processing unit.

4. The system of claim 1, wherein the frequency exchange module, the first baseband processing unit and the second baseband processing unit are placed in a same baseband board of the BS.

5. A base station (BS) capable of communicating with a user equipment (UE) via a serving cell and a coordinated cell, the BS comprising:
a frequency exchange module coupled with a first baseband processing unit and a second baseband processing unit, the first baseband processing unit designated for supporting baseband processing related to the coordinated cell, the second baseband processing unit designated for supporting baseband processing related to the serving cell, wherein
the first baseband processing unit is configured to perform fast Fourier transformation (FFT) and de-mapping processing on a first time domain signal and obtain a first frequency domain signal of the UE in the coordinated cell according to first high-layer configuration information, wherein the first high-layer configuration information comprises a first sub-carrier that is configured by the high layer and is used when the UE sends data;
the frequency exchange module is configured to:
receive the first frequency domain signal from the first baseband processing unit; and
forward the first frequency domain signal to the second baseband processing unit; and
the second baseband processing unit is configured to:
perform fast Fourier transformation, FFT, and de-mapping processing on a second time domain signal;
obtain the second frequency domain signal of the UE in the serving cell according to second high-layer configuration information, wherein the second high-layer configuration information comprises a second sub-carrier that is configured by a high layer and is used when the UE sends data;
receive the first frequency domain signal from the frequency exchange module; and
perform a joint processing on the first frequency domain signal and the second frequency domain signal.

6. The BS of claim 5, wherein the joint processing comprises a multiple input multiple output (MIMO) decoding and an equalization of the first frequency domain signal and the second frequency domain signal for the UE.

7. The BS of claim 5, wherein the BS further comprises a time domain exchange module coupled with the first baseband processing unit and the second baseband processing unit, and the time domain exchange module is configured to:
receive a first time domain signal via the coordinated cell, the first time domain signal derived from the signal sent by the UE;
forward the first time domain signal to the first baseband processing unit;
receive a second time domain signal via the serving cell, the second time domain signal derived from the signal sent by the UE; and
forward the second time domain signal to the second baseband processing unit.

8. The BS of claim 5, wherein the frequency exchange module, the first baseband processing unit and the second baseband processing unit are placed in a same baseband board of the BS.

9. A method of facilitating processing of a signal sent by a user equipment (UE) to a base station (BS), the BS capable of communicating with the UE via a serving cell and a coordinated cell, the BS comprising a frequency exchange module coupled with a first baseband processing unit and a second baseband processing unit, the first baseband processing unit being-designated for supporting baseband processing related to the coordinated cell, the second baseband processing unit designated for supporting baseband processing related to the serving cell, the method comprising:
performing, by the first baseband processing unit, fast Fourier transformation (FFT) and de-mapping processing on a first time domain signal;
obtaining, by the first baseband processing unit, a first frequency domain signal of the UE in the coordinated cell according to first high-layer configuration information, wherein the first high-layer configuration information comprises a first sub-carrier that is configured by the high layer and is used when the UE sends data;
receiving, by the frequency exchange module, the first frequency domain signal from the first baseband processing unit;
forwarding, by the frequency exchange module, the first frequency domain signal to the second baseband processing unit;
performing, by the second baseband processing unit, fast Fourier transformation, FFT, and de-mapping processing on a second time domain signal;
obtaining, by the second baseband processing unit, the second frequency domain signal of the UE in the serving cell according to second high-layer configuration information, wherein the second high-layer configuration information comprises a second sub-carrier that is configured by a high layer and is used when the UE sends data;
receiving, by the second baseband processing unit, the first frequency domain signal from the frequency exchange module; and
performing, by the second baseband processing unit, a joint processing on the first frequency domain signal and the second frequency domain signal.

10. The method of claim 9, wherein the joint processing comprises a multiple input multiple output (MIMO) decoding and an equalization of the first frequency domain signal and the second frequency domain signal for the UE.

11. The method of claim 9, the method further comprising:
receiving, by a time domain exchange module, a first time domain signal via the coordinated cell, the first time domain signal derived from the signal sent by the UE, the time domain exchange module coupled with the first baseband processing unit and the second baseband processing unit;

forward, by the time domain exchange module, the first time domain signal to the first baseband processing unit;

receive, by the time domain exchange module, a second time domain signal via the serving cell, the second time domain signal derived from the signal sent by the UE; and forward, by the time domain exchange module, the second time domain signal to the second baseband processing unit.

\* \* \* \* \*